(12) United States Patent  (10) Patent No.: US 7,586,913 B2
Okubo et al.  (45) Date of Patent: Sep. 8, 2009

(54) MOBILE IP PACKET COMMUNICATION SYSTEM

(75) Inventors: Akira Okubo, Tokyo (JP); Hiroshi Matsuyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/468,408

(22) PCT Filed: Mar. 1, 2001

(86) PCT No.: PCT/JP01/01587

§ 371 (c)(1),
(2), (4) Date: Sep. 2, 2003

(87) PCT Pub. No.: WO02/071775

PCT Pub. Date: Sep. 12, 2002

(65) Prior Publication Data

US 2004/0076158 A1  Apr. 22, 2004

(51) Int. Cl.
*H04L 12/56* (2006.01)
(52) U.S. Cl. .................. 370/390; 370/474; 370/312; 455/445
(58) Field of Classification Search .............. 370/310, 370/328, 389, 392, 397, 399, 331, 329, 338, 370/351, 352, 390, 401, 432, 465, 473; 455/422.1, 455/432.1, 435.1, 436, 437, 442, 445
See application file for complete search history.

(56) References Cited

U.S. PATENT DOCUMENTS

| 5,036,518 | A | * | 7/1991 | Tseung | 714/748 |
| 5,168,492 | A | * | 12/1992 | Beshai et al. | 370/353 |
| 5,550,848 | A | * | 8/1996 | Doshi et al. | 714/749 |
| 5,699,345 | A | * | 12/1997 | Watanuki et al. | 370/232 |
| 5,884,040 | A | * | 3/1999 | Chung | 709/227 |
| 5,896,379 | A | * | 4/1999 | Haber | 370/390 |
| 5,963,550 | A | * | 10/1999 | Hirata et al. | 370/349 |
| 6,031,841 | A | * | 2/2000 | Woundy | 370/410 |
| 6,141,347 | A | * | 10/2000 | Shaughnessy et al. | 370/390 |

(Continued)

FOREIGN PATENT DOCUMENTS

JP  6-188831  7/1994

(Continued)

OTHER PUBLICATIONS

Lai, Jiunn-Ru and Wanjiun Liao, "Mobile Multicast with Routing Optimization for Recipient Mobility," IEEE, Jan. 17, 2001, pp. 199-206.*

*Primary Examiner*—Aung S Moe
*Assistant Examiner*—Curtis A Alia
(74) *Attorney, Agent, or Firm*—Oblon, Spivak, McClelland, Maier & Neustadt, P.C.

(57) ABSTRACT

When receiving a packet sent thereto from a mobile terminal that is a sending source, a subscriber packet exchange apparatus encapsulates the packet with a multicast address without acquiring information on a routing area in which another mobile terminal that is a destination is currently located from a home location register, and routes the packet to another subscriber packet exchange apparatus that manages the routing area in which the destination mobile terminal is currently located. As a result, the moving object IP packet communication system can carry out the transmission of data packets between the source and destination mobile terminals while reducing the transfer delay.

12 Claims, 20 Drawing Sheets

U.S. PATENT DOCUMENTS

| | | | |
|---|---|---|---|
| 6,240,089 B1 * | 5/2001 | Okanoue et al. | 370/390 |
| 6,246,878 B1 * | 6/2001 | Wallentin | 455/442 |
| 6,349,091 B1 * | 2/2002 | Li | 370/238 |
| 6,466,556 B1 * | 10/2002 | Boudreaux | 370/331 |
| 6,487,406 B1 * | 11/2002 | Chang et al. | 455/422.1 |
| 6,512,754 B2 * | 1/2003 | Feder et al. | 370/338 |
| 6,529,511 B1 * | 3/2003 | Du et al. | 370/397 |
| 6,539,237 B1 * | 3/2003 | Sayers et al. | 455/555 |
| 6,581,175 B1 * | 6/2003 | Crump et al. | 714/748 |
| 6,584,098 B1 * | 6/2003 | Dutnall | 370/354 |
| 6,654,589 B1 * | 11/2003 | Haumont | 455/67.11 |
| 6,728,208 B1 * | 4/2004 | Puuskari | 370/230.1 |
| 6,735,202 B1 * | 5/2004 | Ahmed et al. | 370/392 |
| 6,765,892 B1 * | 7/2004 | Leung et al. | 370/332 |
| 6,810,026 B1 * | 10/2004 | Huttunen | 370/310 |
| 6,850,758 B1 * | 2/2005 | Paul et al. | 455/422.1 |
| 6,853,627 B1 * | 2/2005 | Evans | 370/312 |
| 6,917,613 B1 * | 7/2005 | Tiburtius et al. | 370/353 |
| 6,970,449 B1 * | 11/2005 | Smith et al. | 370/349 |
| 7,006,827 B2 * | 2/2006 | Masuda et al. | 455/439 |
| 7,042,855 B1 * | 5/2006 | Gilchrist et al. | 370/328 |
| 7,106,735 B2 * | 9/2006 | Yagyu et al. | 370/390 |
| 7,190,680 B2 * | 3/2007 | Lim | 370/312 |
| 7,209,457 B1 * | 4/2007 | Leuca et al. | 370/328 |
| 2001/0017850 A1 * | 8/2001 | Kalliokulju et al. | 370/331 |
| 2001/0036830 A1 * | 11/2001 | Wu et al. | 455/436 |
| 2001/0043598 A1 * | 11/2001 | Brabenac | 370/389 |
| 2001/0043601 A1 * | 11/2001 | Yamano et al. | 370/390 |
| 2002/0026525 A1 * | 2/2002 | Armitage | 709/238 |
| 2002/0068584 A1 * | 6/2002 | Gage et al. | 455/456 |
| 2002/0075812 A1 * | 6/2002 | Corwin | 370/254 |
| 2002/0150094 A1 * | 10/2002 | Cheng et al. | 370/389 |
| 2002/0181437 A1 * | 12/2002 | Ohkubo et al. | 370/349 |
| 2002/0184510 A1 * | 12/2002 | Shieh | 713/185 |
| 2002/0196781 A1 * | 12/2002 | Salovuori | 370/352 |
| 2003/0039232 A1 * | 2/2003 | Casati et al. | 370/337 |
| 2006/0072572 A1 * | 4/2006 | Ikeda et al. | 370/390 |

FOREIGN PATENT DOCUMENTS

| | | |
|---|---|---|
| JP | 8-186605 | 7/1996 |
| JP | 11-266278 | 9/1999 |
| JP | 11-355281 | 12/1999 |
| JP | 2000-92562 | 3/2000 |
| JP | 2000-183873 | 6/2000 |
| JP | 2000-217157 | 8/2000 |
| WO | 96/21328 | 7/1996 |

* cited by examiner

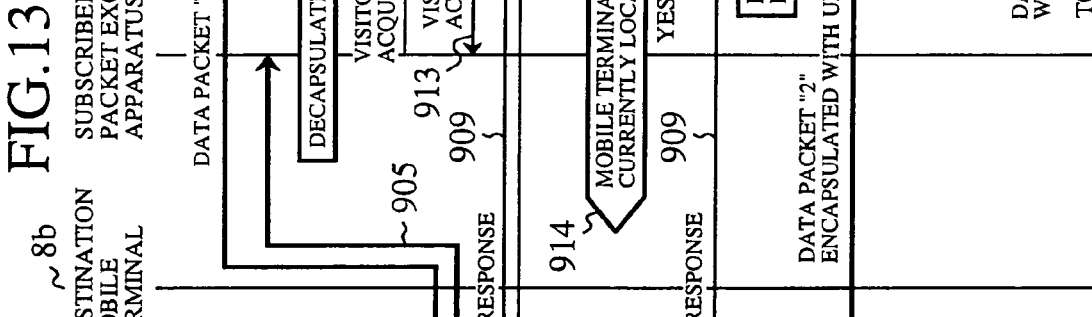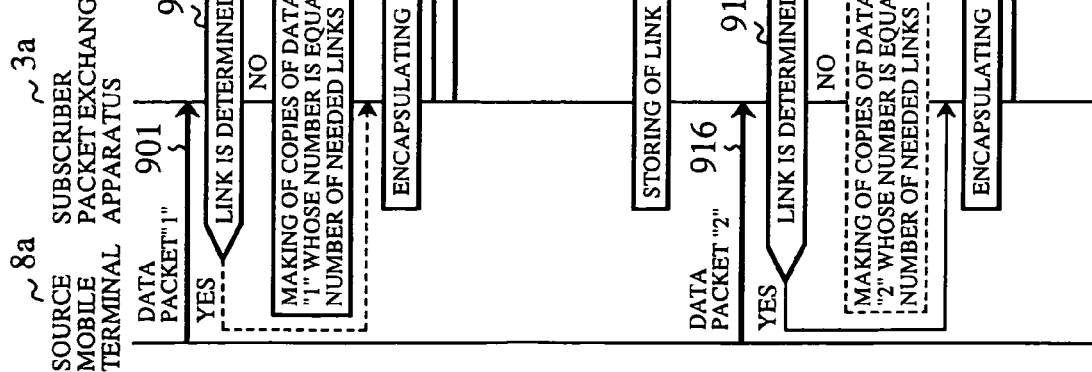
FIG.13

PRIOR ART

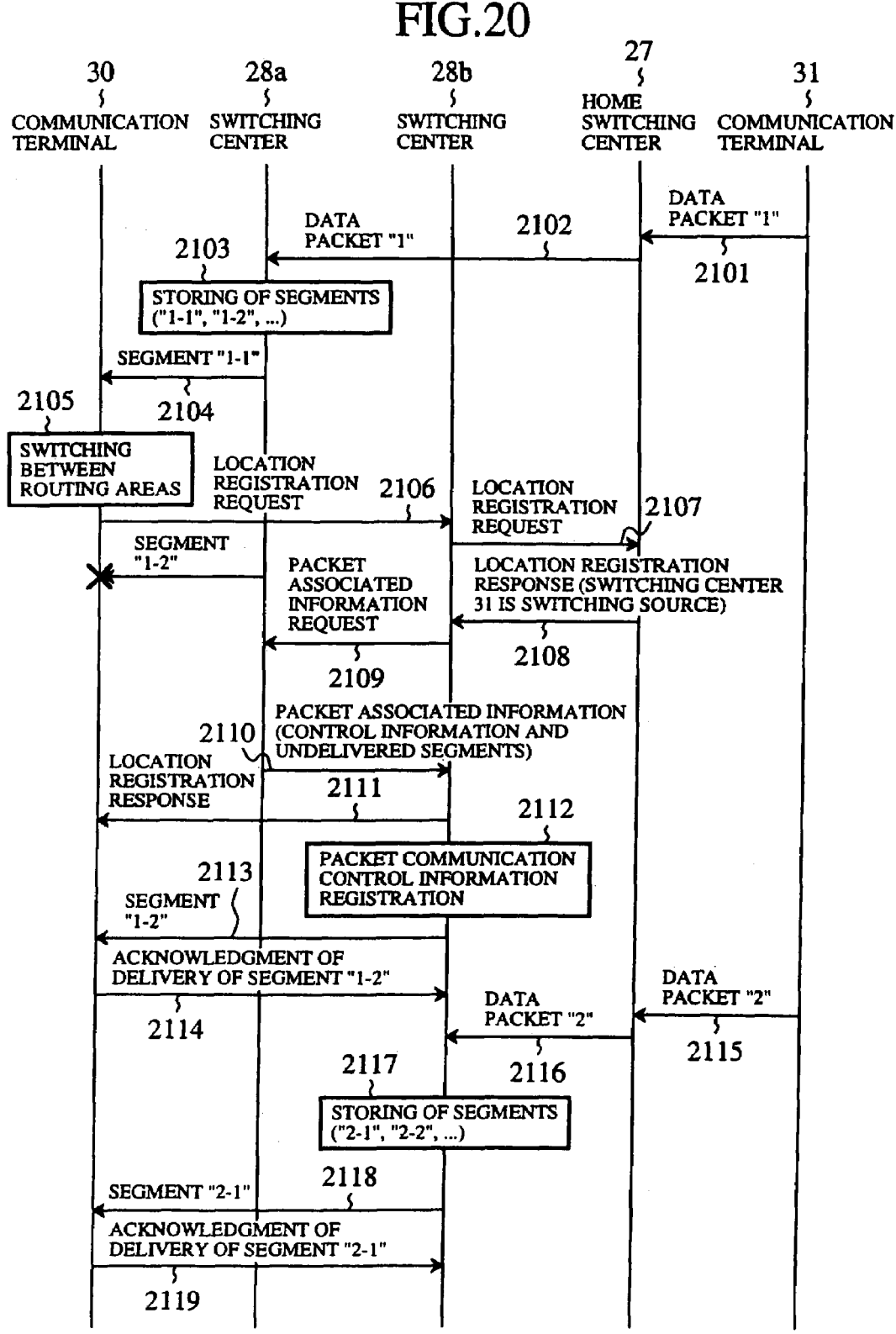

MOBILE IP PACKET COMMUNICATION SYSTEM

FIELD OF THE INVENTION

The present invention relates to a mobile IP packet communication system in which a subscriber packet exchange apparatus that is a sending source encapsulates packets to be sent to either a mobile terminal or a fixed terminal that is a sending destination with a multicast address and transfers them to either the mobile terminal or the fixed terminal without acquiring information on the location of either the mobile terminal or the fixed terminal from a home location register or a visitor location register through mobile packet communications.

BACKGROUND OF THE INVENTION

Recently, a variety of packet communication systems that mainly comply with IP (Internet Protocol) have been developed even in the field of mobile communications as the demand for the Internet communications grows. Particularly, a speed-enhancement and band-broadening technology that has not been provided in the past will be achieved in IMT (International Mobile Telecommunication)-2000, which is placed as a third generation mobile communication system, and packet communications that mainly comply with IP in the field of mobile communications will be widely used.

For example, republished PC application publication No. WO96/21328 (packet transfer method and mobile communication system), Japanese patent application publication (TOKKAIHEI) No. 8-186605 (mobile packet communication method), and so on disclose prior art techniques concerning such a packet transmission system.

FIG. 17 is a block diagram showing the structure of a prior art packet network as disclosed in republished PCT application publication No. WO96/21328. In the figure, reference numeral 8 denotes a mobile terminal, reference numeral 21 denotes a database, reference numerals 22b and 22c denote packet data exchange apparatuses, reference numerals 23a to 23c denote signal processing circuits, reference numeral 24 denotes a subscriber information memory, reference numeral 25 denotes a subscriber information cache memory, and reference numeral 26 denotes a memory for storing information on subscribers which are currently located in a given servicing area.

Next, a description will be made as to an operation of the prior art packet network.

FIG. 18 is a sequence diagram for explaining control in the packet network constructed as shown in the above figure. When an incoming packet arrives at the packet data exchange apparatus 22b (2001), the packet data exchange apparatus 22b determines whether or not subscriber information is cashed. When no cached information exists, the packet data exchange apparatus 22b reads the subscriber information from the database 21 (2004 to 2008) and stores it in the subscriber information cache memory 25 (2009 to 2011). In contrast, when the subscriber information is cached, the packet data exchange apparatus 22b acquires the subscriber information from the subscriber information cache memory 25 (2018 to 2020).

The packet data exchange apparatus 22b then determines if it transfers the incoming packet to which packet data exchange apparatus from the acquired subscriber information (2012 to 2021), and transfers the incoming packet to the other packet data exchange apparatus 22c that manages a servicing area in which the mobile terminal 8 is currently located (2013 or 2022). The other packet data exchange apparatus 22c at which the incoming packet arrives searches for a radio channel number for the mobile terminal 8, which corresponds to the incoming packet (2014 to 2016), and performs transfer of the incoming packet from the packet data exchange apparatus 22c that manages a servicing area in which the mobile terminal 8 is currently located to the mobile terminal 8 by way of the searched radio channel. Packets to be sent to the mobile terminal 8 are thus transferred one by one through the sequential processes mentioned above.

FIG. 19 is a block diagram showing the structure of a prior art mobile packet communication system as disclosed in Japanese patent application publication (TOKKAIHEI) No. 8-186605. In the figure, reference numeral 27 denotes a home switching center, reference numerals 28a and 28b denote switching centers, reference numeral 29a and 29b denote respective routing areas of the switching centers, reference numeral 30 and 31 denote communication terminals, reference numeral 32 denotes an old route, reference numeral 33 denotes a new route, reference numeral 34 denotes a packet communication control information packet or segment that have not yet reached.

Next, a description will be made as to an operation of the prior art mobile packet communication system.

FIG. 20 is a sequence diagram for explaining the operation of the mobile packet communication system that is so constructed as above. The home switching center 27 divides a data packet "1" (2101, 2102) that is sent from the communication terminal 31 that is a sending source to the other communication terminal 30 into segments, and transmits, by radio, those segments starting from a segment "1-1", which is generated first, to the communication terminal 30 that is a destination one by one (2104). At this time, the switching center 28a stores undelivered segments that have not yet reached until receiving an acknowledgment signal indicating that the reception of the data packet is complete from the communication terminal 30.

When the communication terminal 30 moves to the routing area 29b of the switching center 28b before receiving the next segment "1-2", the switching center 28b that is the destination to which the communication terminal 30 moves transmits a location registration request (2106) made by the communication terminal 30 to the home switching center 27 and notifies the home switching center 27 that the communication terminal 30 is currently located in the routing area 29b thereof (2107). After updating the location information on the location of the communication terminal 30 according to this location registration request, the home switching center 27 notifies the switching center 28b that the switching center 28a manages the routing area 29a from which the communication terminal 30 moves and also transmits a location registration response to the switching center 28b (2108).

The switching center 28b makes a request of the switching center 28a that manages the routing area 29a from which the communication terminal 30 moves to transfer packet associated information thereto in response to this notification (2109). In response to the request, the switching center 28a transfers control information on packet communication concerning the communication terminal 30 and segments following the segment "1-2", which have not yet reached, to the switching center 28b (2110). The switching center 28b transmits by radio those segments that have not yet reached to the communication terminal 30 one by one based on the acquired packet communication control information (2113).

When receiving the next data packet "2" destined for the communication terminal 30 from the communication terminal 31 that is the sending source of the packet (2115) after updating the location information on the location of the communication terminal 30, the home switching center 27 transfers the packet 2 to the switching center 28b that manages the routing area to which the communication terminal 30 moves. When receiving the data packet "2" (2116), the switching center 28b divides the data packet "2" into a plurality of segments and transmits by radio the plurality of segments starting from the first segment "2-1" to the communication terminal 30 one by one.

In the prior art mobile IP packet communication system constructed as above and disclosed in republished PCT application publication No. WO96/21328, the packet exchange apparatus 22b stores the information on a routing area in which a destination mobile terminal 8 is currently located, which is obtained when the mobile terminal 8 performs the location registration, in either the database 21 disposed outside the packet exchange apparatus 22b, for storing the location information on the location of the mobile terminal 8, or the subscriber information cache memory 25 within the packet exchange apparatus 22b, reads out the location information on the location of the mobile terminal 8, which the packet exchange apparatus 22b has stored, when transferring packets destined for the mobile terminal 8, and routes the incoming packets to the packet exchange apparatus 22c that manages the routing area in which the destination mobile terminal 8 is currently located based on the location information, and the packet data exchange apparatus 22c transfers the incoming packets to the mobile terminal 8 by way of a searched radio channel. Therefore a problem with the prior art mobile IP packet communication system is that even packet communications between two mobile terminals 8 should be carried out by way of a packet exchange apparatus having visitor area information on the destination mobile terminal 8 and packets cannot be routed directly between two corresponding packet exchange apparatuses that manage routing areas in which the two mobile terminals are currently located, respectively.

In the other prior art mobile IP packet communication system constructed as mentioned and disclosed in Japanese patent application publication (TOKKAIHEI) No. 8-186605, transfer of undelivered packets each including both control information, which is necessary to continue packet communications for the communication terminal 30 that has moved between the switching center 28a from which the communication terminal 30 has moved and the switching center 28b to which the communication terminal 30 has moved, and segments into which each packet is divided is carried out, and they are also transferred from the home switching center 27 to the switching center 28b that manages a routing area in which the communication terminal 30 is currently located by way of a new communication path (i.e., the new route 33) which is established after the communication terminal 30 moves, as in the case where an old communication path (i.e., the old route 32) was established before the communication terminal 30 moves. Therefore, a problem with the other prior art mobile IP packet communication system is that even when a communication terminal that is carrying out packet communications with another communication terminal moves, packets cannot be routed directly between two corresponding packet exchange apparatuses that manage routing areas in which the two communication terminals are currently located, respectively.

Besides the above-mentioned references, there are some references concerning such a prior art mobile IP packet communication system. For example, Japanese patent application publications No. 2000-217157, No. 2000-92562, No. 2000-183873, and No. 11-266278 disclose such a prior art mobile IP packet communication system. Japanese patent application publication No. 2000-217157 relates to a mobile communication multicast packet transmission system that can improve the system efficiency when applying a multicast communication in an IP packet network to mobile communications. Japanese patent application publication No. 2000-92562 relates to a router apparatus that detects movements of a mobile terminal at a high speed. Japanese patent application publication No. 2000-183873 relates to local control through multicasting and global control through unicasting for a data transmission system having a resending control function and a flow control function. Japanese patent application publication No. 11-266278 relates to switching that uses updating of routing information and a virtual connection.

However, neither of these prior art references discloses a technology of encapsulating packets to be transferred with a multicast address and routing the packets directly between source and destination subscriber packet exchange apparatuses, thereby optimizing a routing path between them and reducing the packet transmission delay that occurs between the source and destination mobile terminals.

The present invention is proposed to solve the above-mentioned problems, and it is therefore an object of the present invention to provide a mobile IP packet communication system that can reduce the transfer delay by optimizing a routing path in mobile communications between mobile terminals, and therefore can efficiently carry out packet transfer.

DISCLOSURE OF THE INVENTION

In accordance with the present invention, there is provided a moving object IP packet communication system in which when transferring a packet sent thereto from a mobile terminal that is a sending source to a subscriber packet exchange apparatus to which another mobile terminal that is a destination belongs, another subscriber packet exchange apparatus that manages a routing area in which the source mobile terminal is currently located encapsulates the packet with a multicast address without acquiring location information on the location of the destination mobile terminal from either a home location register or a corresponding visitor location register. As a result, the moving object IP packet communication system can efficiently carry out the transmission of packets between the source and destination mobile terminals while reducing the transfer delay.

In the mobile IP packet communication system in accordance with the present invention, when receiving the packet encapsulated with the multicast address and destined for the destination mobile terminal, the subscriber packet exchange apparatus to which the destination mobile terminal belongs decapsulates the received packet and transfers the decapsulated packet to the destination mobile terminal and transmits a response message indicating that the destination mobile terminal is currently located in the routing area managed thereby to the other subscriber packet exchange apparatus that is the sending source. As a result, the amount of signals being transmitted in the mobile IP packet communication system can be reduced. The mobile IP packet communication system can also carry out the transmission of packets between the source and destination mobile terminals with efficiency while reducing the transfer delay.

In the mobile IP packet communication system in accordance with the present invention, the subscriber packet exchange apparatus which has received the packet that is encapsulated with the multicast address and that is sent to the destination mobile terminal and to which the destination mobile terminal belongs decapsulates the received packet and transfers the decapsulated packet to the destination mobile terminal, and starts a timer when transmitting the response message and repeatedly transmits the response message to the other subscriber packet exchange apparatus that is the sending source until the timer expires. As a result, the other subscriber packet exchange apparatus can surely receive the visitor response message, thereby reducing the amount of signals being transmitted in the mobile IP packet communication system. The mobile IP packet communication system can also carry out the transmission of packets between the source and destination mobile terminals with efficiency while reducing the transfer delay.

In the mobile IP packet communication system in accordance with the present invention, after encapsulating the packet that the other subscriber packet exchange apparatus has received from the source mobile terminal and transferring the packet to the subscriber packet exchange apparatus to which the destination mobile terminal belongs, the other subscriber packet exchange apparatus provides a status notification region for notification of communication status in a header region of each following packet to be transferred in advance, when receiving the response message from the subscriber packet exchange apparatus to which the destination mobile terminal belongs, notifies the subscriber packet exchange apparatus that is the destination that the other subscriber packet exchange apparatus has already received the response message by using the status notification region of each following packet. As a result, the other subscriber packet exchange apparatus can surely receive the visitor response message, thereby reducing the amount of signals being transmitted in the mobile IP packet communication system. The mobile IP packet communication system can also carry out the transmission of packets between the source and destination mobile terminals with efficiency while reducing the transfer delay.

In the mobile IP packet communication system in accordance with the present invention, in case where the destination mobile terminal transmits a packet to the source mobile terminal when the subscriber packet exchange apparatus that is the destination transmits a response message indicating that the destination mobile terminal is currently located in the routing area managed thereby to the other subscriber packet data exchange that is the sending source, the subscriber packet exchange apparatus transfers the packet from the destination mobile terminal to the source mobile terminal by superimposing information corresponding to the response message on the packet. As a result, the amount of signals being transmitted in the mobile IP packet communication system can be reduced without having to use the visitor response message. The mobile IP packet communication system can also carry out the transmission of packets between the source and destination mobile terminals with efficiency while reducing the transfer delay.

In the mobile IP packet communication system in accordance with the present invention, when transferring the packet received from the source mobile terminal to either the subscriber packet exchange apparatus to which the destination mobile terminal belongs or an external packet data network to which a fixed terminal that is a destination belongs, the other subscriber packet exchange apparatus determines whether the packet is destined for either the destination mobile terminal or the fixed terminal, and, when determining that the packet is destined for the destination fixed terminal, transfers the packet to the gateway and packet exchange apparatus without encapsulating the packet with the multicast address. As a result, only when determining that a packet to be transferred is destined for another mobile terminal, the other subscriber packet exchange apparatus encapsulates the packet with a multicast address and transfers the packet to the subscriber packet exchange apparatus to which the destination mobile terminal belongs. The mobile IP packet communication system can also carry out the transmission of packets between the source and destination mobile terminals with efficiency while reducing the transfer delay.

In the mobile IP packet communication system in accordance with the present invention, when transferring the packet received from the source mobile terminal to either the subscriber packet exchange apparatus to which the destination mobile terminal belongs or an external packet data network to which a fixed terminal that is a destination belongs, the other subscriber packet exchange apparatus encapsulates the packet with the multicast address without determining whether the packet is destined for either the destination mobile terminal or the fixed terminal, and, when receiving the packet encapsulated with the multicast address and destined for the destination fixed terminal, the gateway and packet exchange apparatus transfers the received packet to the destination fixed terminal after decapsulating the packet and transmits a response message indicating that the fixed terminal is connected with a network managed thereby to the other subscriber packet exchange apparatus that is the sending source. As a result, the other subscriber packet exchange apparatus can carry out the transmission of data packets without having to inquire about whether each data packet to be transferred is destined for the destination mobile terminal or fixed terminal. The mobile IP packet communication system can also carry out the transmission of packets between the source and destination mobile terminals with efficiency while reducing the transfer delay.

In the mobile IP packet communication system in accordance with the present invention, when transferring the packet received from the source mobile terminal to either the subscriber packet exchange apparatus to which the destination mobile terminal belongs or an external packet data network to which a fixed terminal that is a destination belongs, the other subscriber packet exchange apparatus determines whether the packet is destined for either the destination mobile terminal or the fixed terminal, and encapsulates the packet with the multicast address and transfers the packet without acquiring the location information on the location of the destination mobile terminal from either the home location register or the corresponding visitor location register when determining that the packet is destined for the destination mobile terminal and that the packet is to be transmitted through real-time packet communications. As a result, the mobile IP packet communication system can carry out the transmission of packets between the source and destination mobile terminals with efficiency through real time communications while reducing the transfer delay.

In the mobile IP packet communication system in accordance with the present invention, when receiving the packet encapsulated with the multicast address and destined for the destination fixed terminal, the gateway and packet exchange apparatus decapsulates the received packet and transfers the decapsulated packet to the fixed terminal, and starts a timer when transmitting the response message and repeatedly transmits the response message to the other subscriber packet exchange apparatus that is the sending source until the timer expires, or repeatedly transmits the response message to the other subscriber packet exchange apparatus that is the sending source until being notified that the other subscriber packet exchange apparatus has already received the response message through a status notification region located in a header region of each following packet transmitted thereto. As a result, the other subscriber packet exchange apparatus can carry out the transmission of data packets without having to inquire about whether each data packet is destined for a mobile terminal or a fixed terminal, and the mobile IP packet communication system can surely transmit the visitor response message between the source and destination subscriber packet exchange apparatuses, thereby reducing the amount of signals being transmitted in the mobile IP packet communication system. The mobile IP packet communication system can also carry out the transmission of packets between the source and destination mobile terminals with efficiency while reducing the transfer delay.

In the mobile IP packet communication system in accordance with the present invention, in case where the destination fixed terminal transmits a packet to the source mobile terminal when the gateway and packet exchange apparatus transmits a response message indicating that the fixed terminal is connected with a network managed thereby to the other subscriber packet exchange that is the sending source, the gateway and packet exchange apparatus transfers the packet from the destination fixed terminal to the source mobile terminal by superimposing the response message on the packet. As a result, the other subscriber packet exchange apparatus can carry out the transmission of data packets without having to inquire about whether each data packet is destined for a mobile terminal or a fixed terminal, thereby reducing the amount of signals being transmitted in the mobile IP packet communication system without the use of a visitor response message. The mobile IP packet communication system can also carry out the transmission of packets between the source and destination mobile terminals with efficiency while reducing the transfer delay.

In the mobile IP packet communication system in accordance with the present invention, either the subscriber packet exchange apparatus or the gateway and packet exchange apparatus, which has received the packet encapsulated with the multicast address and destined for destination terminal equipment, decapsulates the received packet and transfers the decapsulated packet to the destination terminal equipment, and transmits an RSVP reserve message, as the response message, to the other subscriber packet exchange apparatus that is the sending source so as to reserve a band. As a result, the mobile IP packet communication system can ensure a given service quality, and can also carry out the transmission of packets between the source and destination mobile terminals with efficiency while reducing the transfer delay.

In the mobile IP packet communication system in accordance with the present invention, either the subscriber packet exchange apparatus or the gateway and packet exchange apparatus, which has received the packet encapsulated with the multicast address and destined for destination terminal equipment, decapsulates the received packet and transfers the decapsulated packet to the destination terminal equipment, and transmits an MPLS LDP message, as the response message, to the other subscriber packet exchange apparatus that is the sending source so as to set a virtual path. As a result, the mobile IP packet communication system can ensure a given service quality, and can also carry out the transmission of packets between the source and destination mobile terminals with efficiency while reducing the transfer delay.

BRIEF DESCRIPTION OF THE FIGURES

FIG. 13 is a sequence diagram for explaining an operation of a mobile IP packet communication system in accordance with embodiment 9 of the present invention;

FIG. 20 is a sequence diagram for explaining an operation of the other prior art mobile IP packet communication system as shown in FIG. 19.

PREFERRED EMBODIMENTS OF THE INVENTION

In order to explain the present invention in greater detail, the preferred embodiments will be described below with reference to the accompanying figures.

Embodiment 1

A description will be made as to a mobile IP packet communication system in which when a subscriber packet exchange apparatus receives a data packet from a mobile terminal that is a sending source and is currently located in a routing area managed thereby, the subscriber packet exchange apparatus encapsulates the data packet with a multicast address without acquiring location information on the location of another mobile terminal that is a destination from a home or visitor location register, and transfers the encapsulated packet to the destination mobile terminal.

Figure 1:
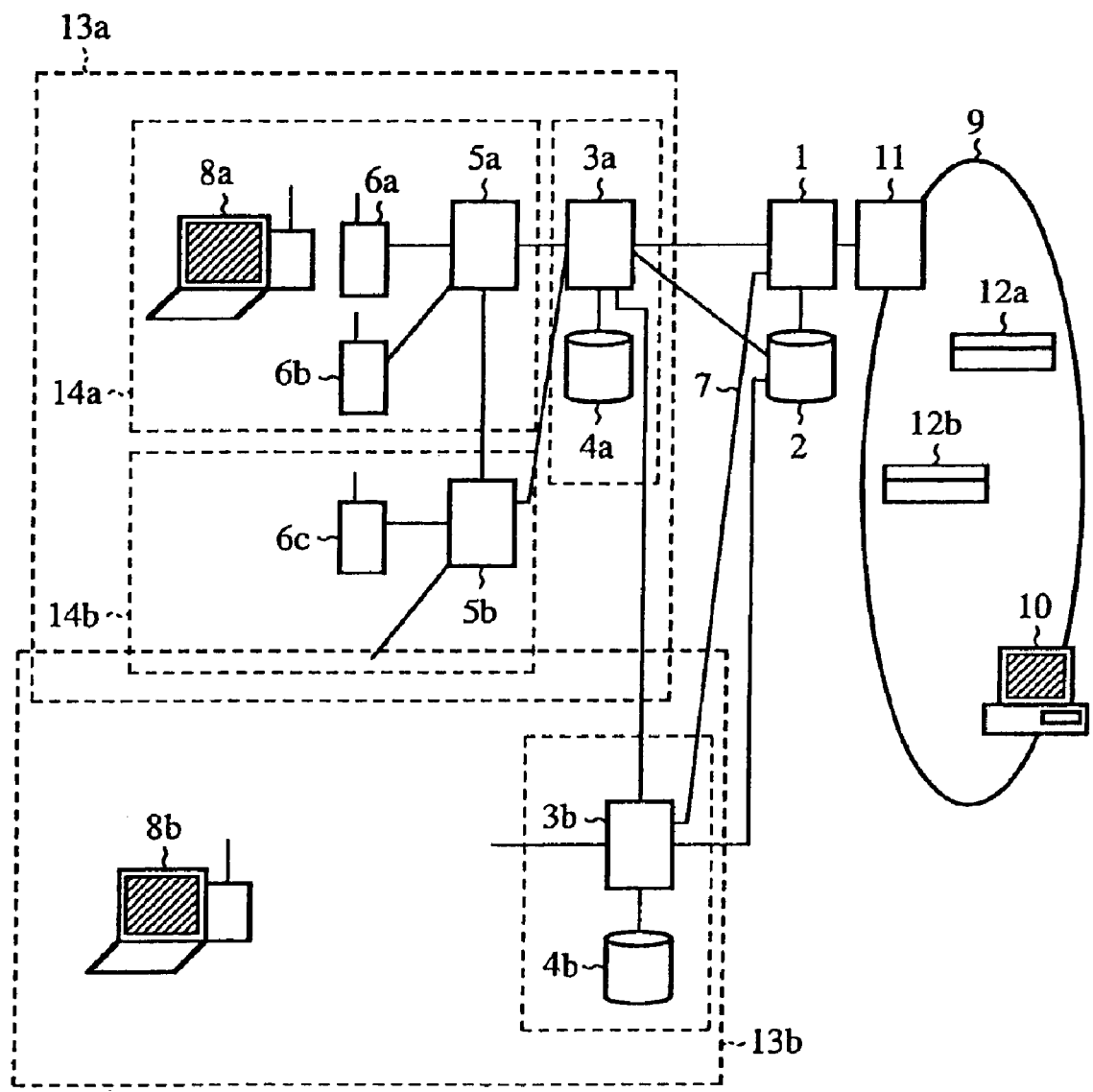
FIG. 1 is a block diagram showing an example of a mobile IP packet communication system in accordance with the present invention as well as an external packet data network.

FIG. 1 is a block diagram showing an example of the mobile IP packet communication system in accordance with the present invention as well as an external packet data network. In the figure, reference numeral 1 denotes a gateway and packet data exchange apparatus having a function of serving as a gateway between the mobile IP packet communication system and the external packet data network, and reference numeral 2 denotes a home location register having a function of storing information, such as the locations of mobile terminals 8a and 8b (i.e., routing areas in which they are currently located, respectively), contracted service contents for each of the mobile terminals 8a and 8b, and charges. Reference numerals 3a and 3b denote subscriber packet exchange apparatuses that manage the communication states of the mobile terminals 8a and 8b and the routing areas 13a and 13b, which will be described later, respectively, and that have functions of transferring data packets including a multicast address to the mobile terminals 8a and 8b, respectively. The communication state of each of the mobile terminals 8a and 8b includes a state in which the corresponding mobile terminal is not connected with an idol network, a state in which no data packet is transmitted for a certain period even though the corresponding mobile terminal is connected with a standby network, and a state in which the corresponding mobile terminal is connected with a ready network and the transmission of data packets is carried out. Reference numerals 4a and 4b denote visitor location registers having functions of storing information, such as zones 14a and 14b in which the mobile terminals 8a and 8b can be currently located, respectively.

Reference numerals 5a and 5b denote base station control apparatuses each having a function of managing two or more of a plurality of radio base stations 6a to 6c and for controlling a radio channel, reference numerals 6a to 6c denote the plurality of radio base stations which are connected with the plurality of mobile terminals 8a and 8b by way of radio channels, for controlling the transmission of data packets between the plurality of mobile terminals 8a and 8b, reference numeral 7 denotes transmissions path via which the plurality of components are connected with one another, and reference numerals 8a to 8b denote the plurality of mobile terminals each of which can be connected with each of the plurality of radio base stations 6a to 6c, and each of which has a function of sending and receiving data packets.

Reference numeral 9 denote the external packet data network such as an internet or intranet, reference numeral 10 denotes a data terminal (i.e., a fixed terminal) that is connected with this packet data network 9 and that carries out packet communications, reference numeral 11 denotes a gateway disposed in the external packet data network 9, for interfacing with the network of the mobile IP packet communication system having the above-mentioned structure, reference numerals 12a and 12b denote routers for carrying out routing of packets in the packet data network 9 according to information on routes in the network, reference numeral 13a denotes the routing area that consists of the plurality of radio base stations 6a to 6c, and the base station control apparatuses 5a and 5b, reference numeral 13b denotes the routing area that consists of a plurality of radio base stations and a plurality of base station control apparatuses, and reference numerals 14a and 14b denote the routing zones (also referred to as visitor zones from here on) in which the mobile terminals 8a and 8b are currently located, respectively.

Although FIG. 1 shows an example of the structure in which the subscriber packet exchange apparatuses 3a and 3b and the visitor location registers 4a and 4b are separately disposed, the subscriber packet exchange apparatus 3a and the visitor location register 4a can be implemented as a single apparatus enclosed by a dashed line and the subscriber packet exchange apparatus 3b and the visitor location register 4b can also be implemented as a single apparatus enclosed by a dashed line.

Next, a description will be made as to an operation of the mobile IP packet communication system in accordance with embodiment 1 of the present invention.

Figure 2:
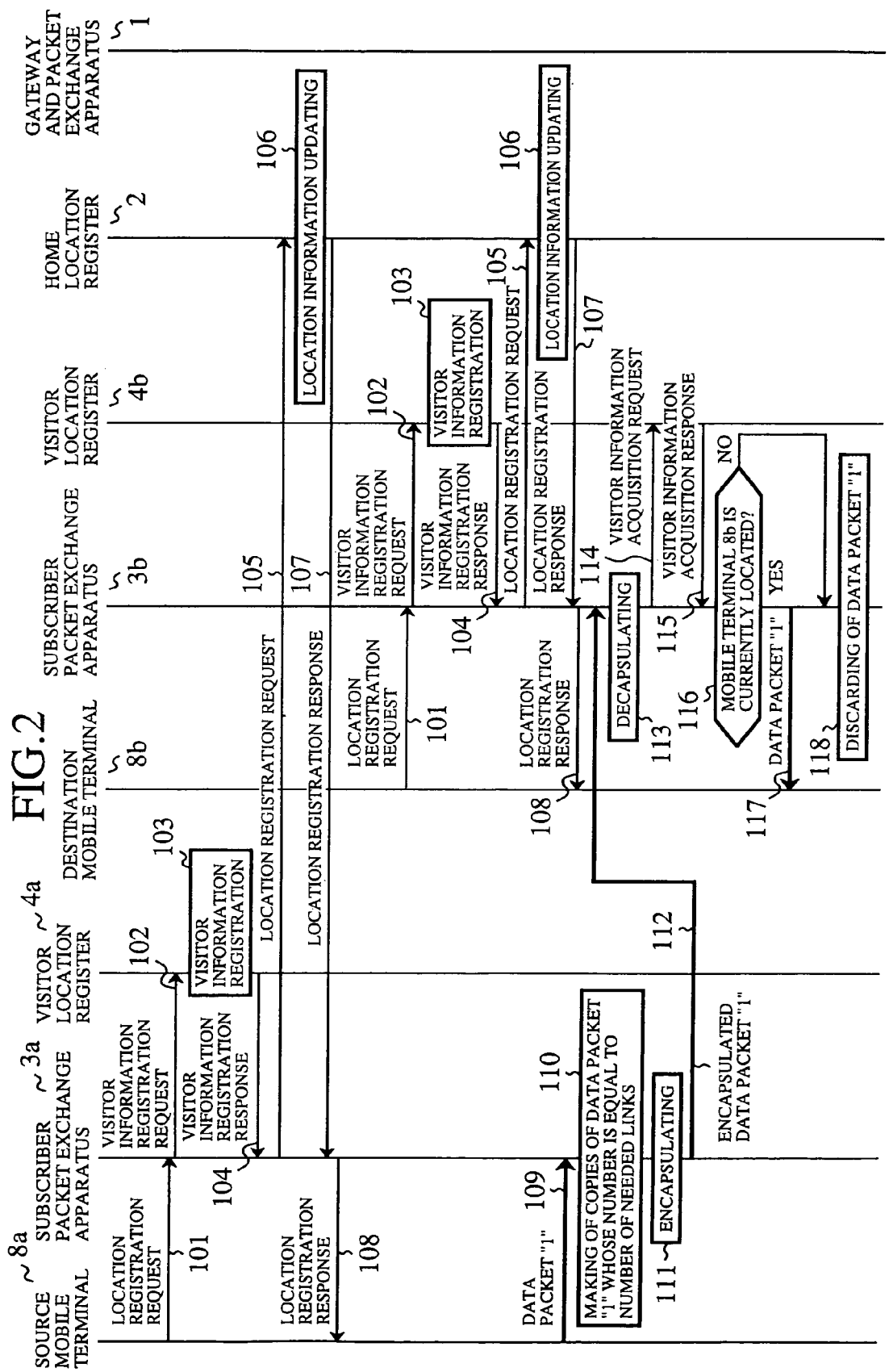
FIG. 2 is a sequence diagram for explaining an operation of a mobile IP packet communication system in accordance with embodiment 1 of the present invention.
Figure 3:
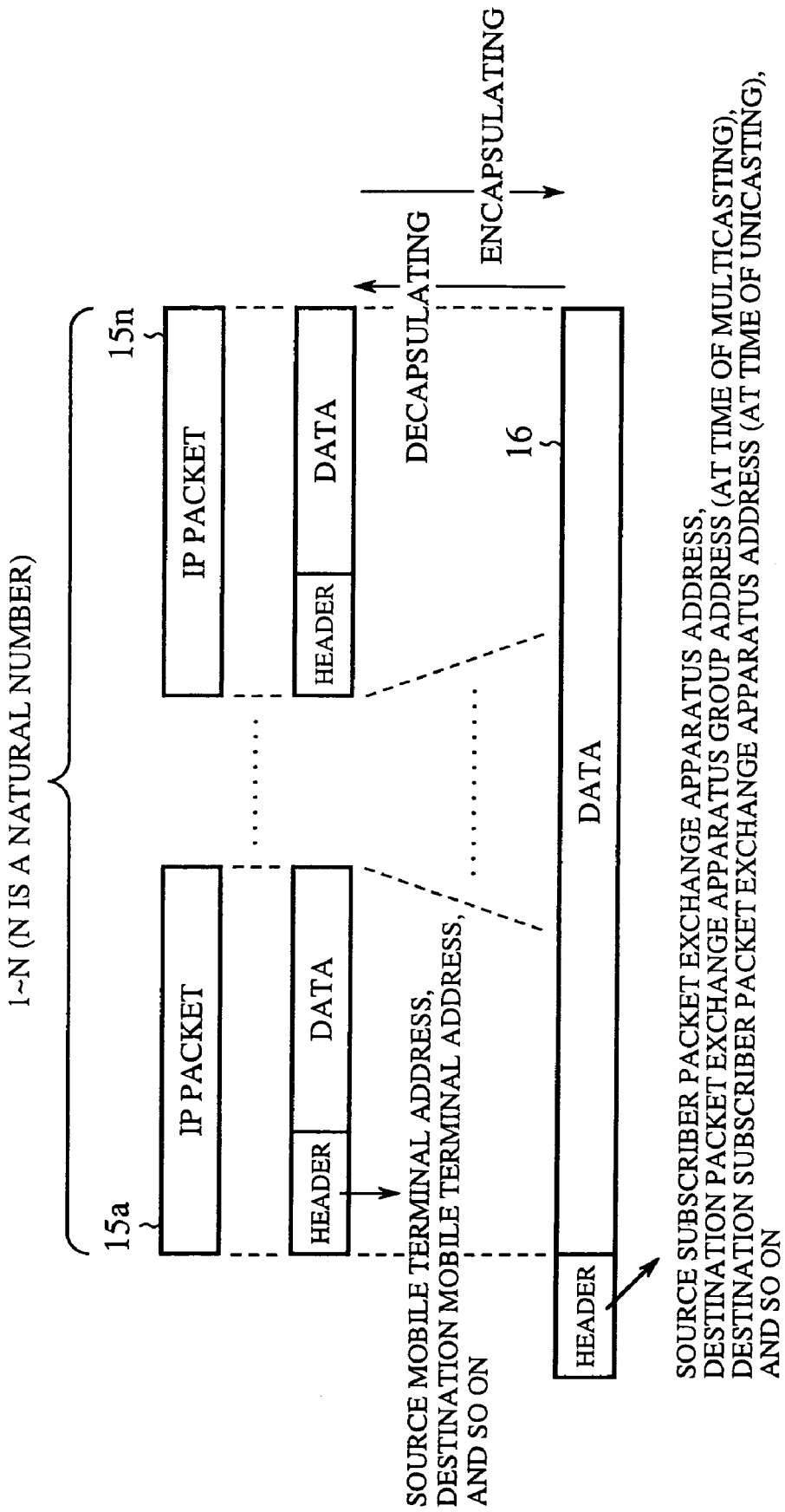
FIG. 3 is an explanatory drawing showing the format of user data packets transferred between a gateway and packet data exchange apparatus (i.e., a dataway packet exchange apparatus) and packet data support apparatuses (i.e., subscriber packet exchange apparatuses) and between the packet data support apparatuses (i.e., the subscriber packet exchange apparatuses) in the mobile IP packet communication system of the present invention.

FIG. 2 is a sequence diagram for explaining the operation of the mobile IP packet communication system of this embodiment 1. The operation of the mobile IP packet communication system in accordance with this embodiment 1 will be explained hereafter with reference to the sequence diagram of FIG. 2. FIG. 3 shows the format of user data packets transferred between the gateway and packet data exchange apparatus 1 and the subscriber packet exchange apparatuses 3a and 3b and between the subscriber packet exchange apparatuses 3a and 3b in the mobile IP packet communication system of the present invention.

In FIG. 3, reference numerals 15a to 15n denote data packets transmitted between the end users (in the case of FIG. 1, the mobile terminals 8a and 8b each of which can be a sending source or destination), and reference numeral 16 denotes a data frame transmitted between a packet data gateway apparatus and a packet data support apparatus, and between packet data support apparatuses. In the example shown in the figure, the data packets 15a to 15n shown are IP packets. As an alternative, the data packets 15a to 15n are not limited to IP packets and can be packets that comply with another protocol.

An address given to each of those data packets 15a to 15n transmitted between the end users includes, as well as information on the identification of the party of the communication, the location information on the location of the party of the communication that is based on the premise that the locations of the two terminals that are communicating with each other don't change. However, because the end users, i.e., the mobile terminals usually move in the case of mobile communications, the destination address given to each of data packets transmitted between the end users only has the identification of the party of the communication.

Then, as shown in FIG. 3, by encapsulating the data packets 15a to 15n transmitted between the end users using another data frame 16 once and transferring them between the end users, the data packets 15a to 15n can be routed between the subscriber packet exchange apparatuses regardless of the address information of each of the data packets 15a to 15n transmitted between the end users. The data frame 16 can be a frame that complies with a protocol decided between the apparatuses, or can be a general-purpose protocol, such as IP, similar to that that defines transmission of packets between the end users. When data packets to be sent to different mobile terminals are destined for the same routing area in which the plurality of mobile terminals are currently located, all the data packets can be encapsulated into the data frame 16 at the same time. In contrast, when data packets are to be sent to a single mobile terminal, the data packets can be encapsulated one by one into respective data frames or can be encapsulated in two or more pieces into data frames.

Each of the mobile terminal 8a that is a sending source and the mobile terminal 8b that is a destination makes a request of the subscriber packet exchange apparatus 3a or 3b for registration of the location thereof (101) in order to connect with the mobile communication network. Each of the subscriber packet exchange apparatuses 3a and 3b then makes a request for registration of visitor information based on the received information on the location registration request, and registers visitor zone information indicating that a corresponding one of the mobile terminals 8a and 8b is currently located in which zone associated with one of the radio base stations 6a to 6c and is under control of which one of the base station control apparatuses 5a and 5b, the ID of the corresponding one of the mobile terminals 8a and 8b, and so on in a corresponding one of the visitor location registers 4a and 4b (102, 103). After that, when receiving a response to the visitor information registration from a corresponding one of the visitor location registers 4a and 4b (104), each of the subscriber packet exchange apparatuses 3a and 3b transmits the request for the registration of the location of the corresponding mobile terminal to the home location register 2 after giving the code of a corresponding one of the routing areas 13a and 13b in which each of the subscriber packet exchange apparatuses 3a and 3b are located to the request (105).

The home location register 2 performs authentication of the mobile terminals 8a and 8b in response to the received requests for the registration of their locations, and checks to see whether or not each of the mobile terminals 8a and 8b is a subscriber who can have services provided via the mobile communication network that the home location register 2 itself administers. After checking to see whether or not each of the mobile terminals 8a and 8b is a subscriber, the home location register 2 updates the location information on the locations of the mobile terminals 8a and 8b (106) by storing the codes of the routing areas 13a and 13b that have been sent from the subscriber packet exchange apparatuses 3a and 3b, respectively, therein, as well as the IDs of the mobile terminals 8a and 8b. The home location register 2 sends responses to the location registration requests back to the mobile terminals 8a and 8b by way of the subscriber packet exchange apparatuses 3a and 3b that have transmitted the location registration requests thereto, respectively (107, 108).

When receiving data packet "1" (109) transmitted from the mobile terminal 8a to the other mobile terminal 8b, the subscriber packet exchange apparatus 3a makes copies of the data packet whose number is equal to the number of needed links (110), encapsulates the number of copies of the data packet which is equal to the number of links by using a multicast group address of all other subscriber packet exchange apparatuses other than the subscriber packet exchange apparatus 3a, and transfers the encapsulated data packets "1" (112).

When receiving the number of data packets "1" encapsulated with the multicast address, the subscriber packet exchange apparatus 3b retrieves the data packet "1" destined for the mobile terminal 8b by breaking (i.e., decapsulating) the encapsulated data packets (113), and acquires the visitor information on the mobile terminal 8b from the visitor location register 4b (114, 115). The subscriber packet exchange apparatus 3b then determines whether or not the mobile terminal 8b is currently located in a visitor zone managed thereby (116), and, when determining that the mobile terminal 8b is currently located in a visitor zone 13b managed thereby and identifying the visitor zone 13b, transfers the data packet "1" to the mobile terminal 8b by way of a radio base station and a base station control apparatus thereof (117). When the received data packet "1" is not destined for the mobile terminal 8b which is currently located in the identified visitor zone, the subscriber packet exchange apparatus 3b discards the data packet "1" (118).

As mentioned above, in accordance with this embodiment 1, when transferring a packet sent thereto from a mobile terminal that is a sending source to another subscriber packet exchange apparatus to which another mobile terminal that is a destination belongs, the subscriber packet exchange apparatus encapsulates the packet with a multicast address without acquiring information on the location of the destination mobile terminal from a home location register or a visitor location register. Therefore, the subscriber packet exchange apparatus that has received a data packet from the source mobile terminal can route the data packet directly to the other subscriber packet exchange apparatus that manages a routing area in which the destination mobile terminal is currently located, and hence can efficiently carry out the transmission of packets between the source and destination mobile terminals while reducing the transfer delay.

Embodiment 2

In a mobile IP packet communication system in accordance with this embodiment 2, a subscriber packet exchange apparatus that has received a packet encapsulated with a multicast address and destined for a mobile terminal that is a destination, the destination mobile terminal belonging to the subscriber packet exchange apparatus, transfers the packet to the destination mobile terminal after decapsulating it, and transmits a visitor response message to another subscriber packet exchange apparatus that is a sending source of the packet. Hereafter, the mobile IP packet communication system in accordance with this embodiment 2 will be explained with reference to drawings.

The mobile IP packet communication system in accordance with this embodiment 2 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system in accordance with embodiment 2 are as shown in FIG. 3.

Figure 4:
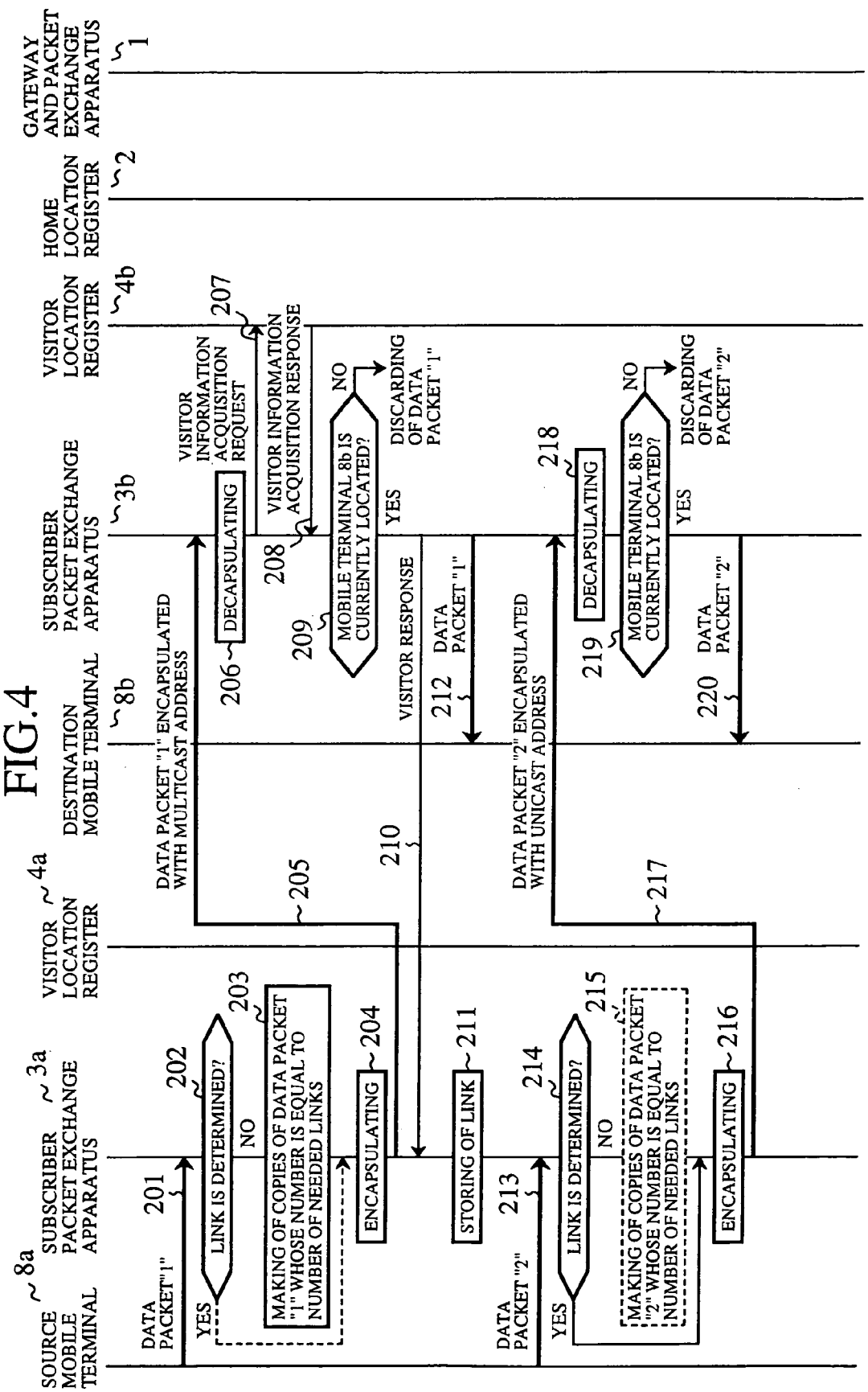
FIG. 4 is a sequence diagram for explaining an operation of a mobile IP packet communication system in accordance with embodiment 2 of the present invention.

FIG. 4 is a sequence diagram for explaining an operation of the mobile IP packet communication system in accordance with embodiment 2 of the present invention. The operation of the mobile IP packet communication system in accordance with this embodiment 2 will be explained hereafter with reference to the sequence diagram of FIG. 4.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" that is sent from the source mobile terminal 8a to the destination mobile terminal 8b, a subscriber packet exchange apparatus 3a determines a link via which the data packet "1" should be sent out (202). Because the subscriber packet exchange apparatus 3a is not sure in which routing area the destination mobile terminal 8b is currently located, after making only a number of copies of the first data packet "1" whose number is equal to the number of needed links (203), as in the case of embodiment 1, and encapsulating the number of data packets "1" with a multicast address (204), the subscriber packet exchange apparatus 3a transfers the number of data packets encapsulated to other subscriber packet exchange apparatuses other than the subscriber packet exchange apparatus 3a itself (205).

When receiving the number of data packets "1" encapsulated with the multicast address, the subscriber packet exchange apparatus 3b retrieves the data packet "1" destined for the mobile terminal 8b by decapsulating the encapsulated data packets (206), and acquires the visitor information on the mobile terminal 8b from a visitor location register 4b (207, 208). The subscriber packet exchange apparatus 3b then determines whether or not the destination mobile terminal 8b is currently located in a routing zone managed thereby (209), and, when determining that the mobile terminal 8b is currently located in a routing zone managed thereby and identifying the routing zone, transfers the data packet "1" to the destination mobile terminal 8b by way of a radio base station and a base station control apparatus thereof (212).

Figure 5:
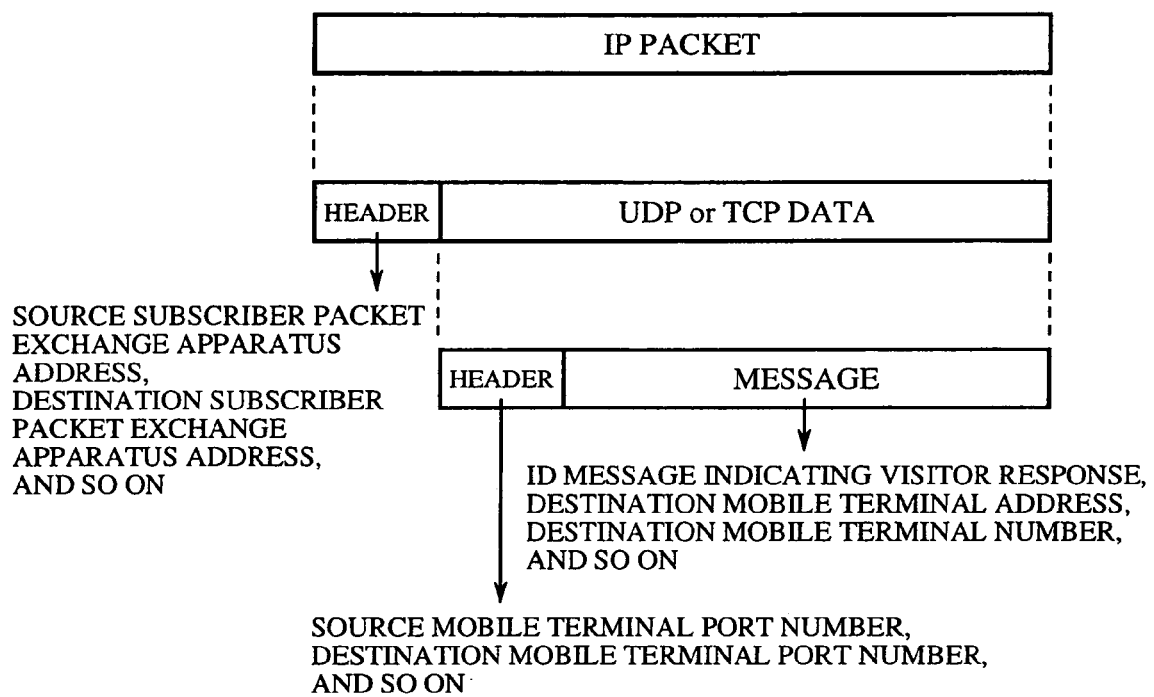
FIG. 5 is a diagram showing the data configuration of a visitor response message in accordance with the present invention.

At this time, the subscriber packet exchange apparatus 3b transmits a visitor response message to the subscriber packet exchange apparatus 3a that has transmitted the encapsulated data packets "1" thereto (210). FIG. 5 shows the data configuration of this visitor response message. When receiving this visitor response message, the subscriber packet exchange apparatus 3a stores the visitor response message as a link to the mobile terminal 8b (211).

After that, when receiving the next data packet "2" (213) that is transmitted from the source mobile terminal 8a to the destination mobile terminal 8b, the subscriber packet exchange apparatus 3a determines a link via which the next data packet should be transmitted (214), as in the case of receiving the first data packet "1". In this case, because the subscriber packet exchange apparatus 3a has already found out the visitor routing destination with the visitor response message, the subscriber packet exchange apparatus 3a encapsulates the next data packet with a unicast address (216) without making copies of the data packet whose number is equal to the number of needed links (215), and transfers the encapsulated data packet "2" only to the subscriber packet exchange apparatus 3b which is the visitor routing destination (217).

When receiving the data packet "2" encapsulated with the unicast address, the subscriber packet exchange apparatus 3b performs the same processing on the received data packet "2" as that performed on the first data packet "1" encapsulated with the multicast address (218, 219), and transfers the decapsulated data packet "2" to the destination mobile terminal 8b (220).

When transferring the data packet "2" to the destination mobile terminal 8b, the subscriber packet exchange apparatus 3b doesn't acquire the visitor information from the visitor location register 4b as shown in FIG. 4. This is because the visitor information acquired when transferring the first data packet "1" has been cached. In contrast, when the visitor information has not been cached, the subscriber packet exchange apparatus 3b acquires the visitor information in the same manner that it does when transferring the data packet "1" (207, 208).

As mentioned above, in accordance with this embodiment 2, a subscriber packet exchange apparatus that has received a packet encapsulated with a multicast address and destined for a mobile terminal that is a destination transmits a visitor response message to another subscriber packet exchange apparatus that is a sending source of the packet. Therefore, the other subscriber packet exchange apparatus that has received the data packet from another mobile terminal that is the sending source can route the data packet directly to the subscriber packet exchange apparatus that manages a routing zone in which the destination mobile terminal is currently located. Furthermore, when transferring the following data packets, the other subscriber packet exchange apparatus can encapsulate them with a unicast address in response to the visitor response message transmitted from the subscriber packet exchange apparatus that is the destination, thereby reducing the amount of signals being transmitted in the mobile IP packet communication system. The mobile IP packet communication system can efficiently carry out the transmission of packets between the source and destination mobile terminals while reducing the transfer delay.

Embodiment 3

In a mobile IP packet communication system in accordance with this embodiment 3, a subscriber packet exchange apparatus that has received a packet that is encapsulated with a multicast address and that is to be sent to a mobile terminal that is a destination, the destination mobile terminal belonging to the subscriber packet exchange apparatus, decapsulates the received packet and transfers the decapsulated packet to the destination mobile terminal, and starts a timer when transmitting a visitor response message to another subscriber packet exchange apparatus that is a sending source and repeatedly transmits the visitor response message to the other subscriber packet exchange apparatus until the timer expires. Hereafter, the mobile IP packet communication system in accordance with this embodiment 3 will be explained with reference to drawings.

The mobile IP packet communication system in accordance with this embodiment 3 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system in accordance with embodiment 3 are as shown in FIG. 3.

Figure 6:
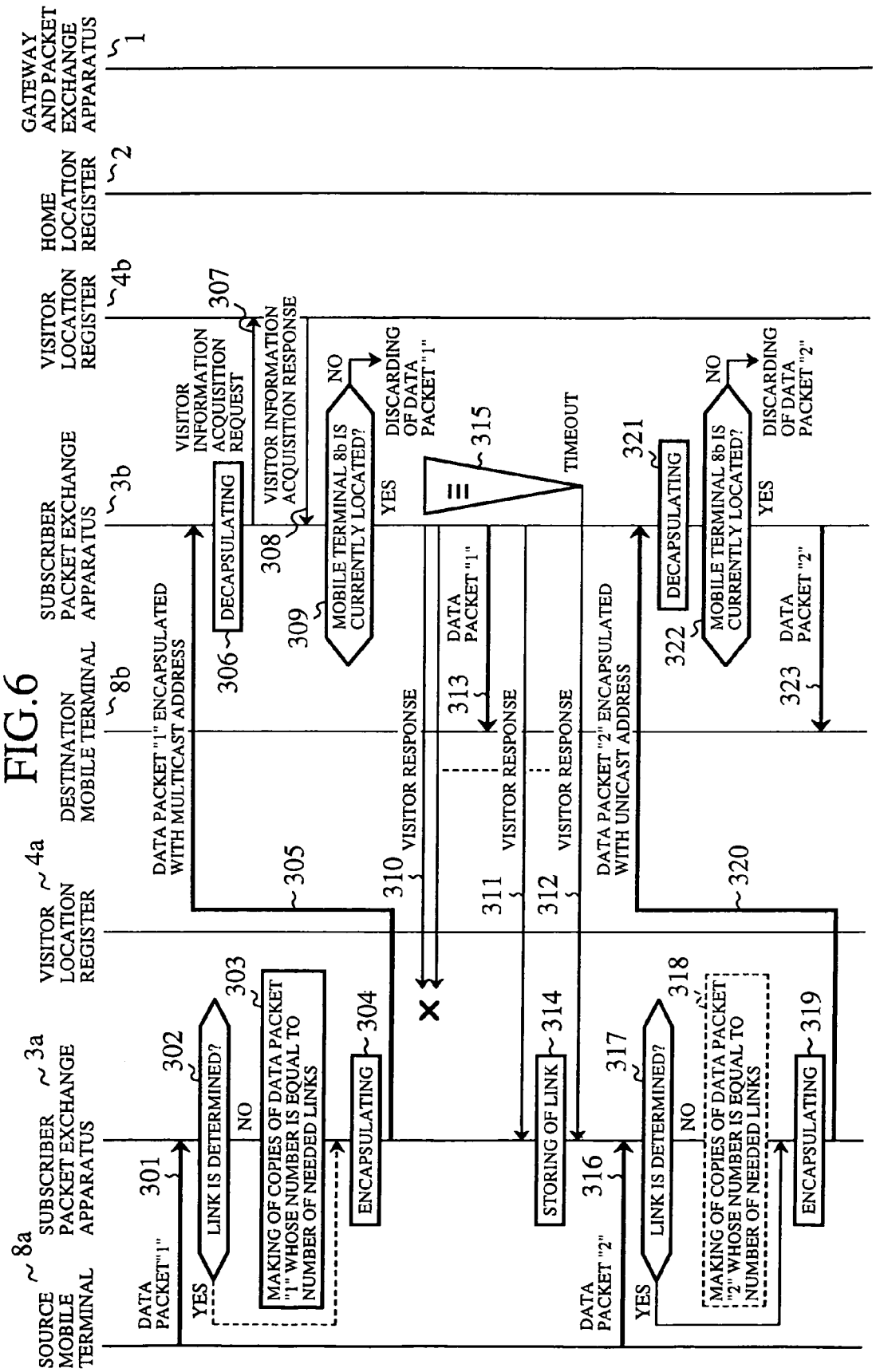
FIG. 6 is a sequence diagram for explaining an operation of a mobile IP packet communication system in accordance with embodiment 3 of the present invention.

FIG. 6 is a sequence diagram for explaining an operation of the mobile IP packet communication system in accordance with embodiment 3 of the present invention. The operation of the mobile IP packet communication system in accordance with this embodiment 3 will be explained hereafter with reference to the sequence diagram of FIG. 6.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (301) that is sent from the source mobile terminal 8a to the destination mobile terminal 8b, the subscriber packet exchange apparatus 3a determines a link via which the data packet "1" should be sent out (302). Because the subscriber packet exchange apparatus 3a is not sure in which routing area the destination mobile terminal 8b is currently located, after making only a number of copies of the first data packet "1" whose number is equal to the number of needed links (303), as in the case of embodiments 1 and 2, and encapsulating the number of data packets "1" with a multicast address (304), the subscriber packet exchange apparatus 3a transfers the number of data packets encapsulated to other subscriber packet exchange apparatuses other than subscriber packet exchange apparatus 3a itself (305).

When receiving the data packet "1" encapsulated with the multicast address, a subscriber packet exchange apparatus 3b retrieves the data packet "1" destined for the mobile terminal 8b by decapsulating the encapsulated data packets (306), and acquires the visitor information on the mobile terminal 8b from a visitor location register 4b (307, 308). The subscriber packet exchange apparatus 3b then determines whether or not the destination mobile terminal 8b is currently located in a routing zone managed thereby (309), and, when determining that the mobile terminal 8b is currently located in a routing zone managed thereby and then identifying the routing zone, transfers the data packet "1" to the destination mobile terminal 8b by way of a radio base station and a base station control apparatus thereof (313).

At this time, the subscriber packet exchange apparatus 3b starts the timer (315) for the subscriber packet exchange apparatus 3a that has transmitted the encapsulated data packet "1" thereto and performs the transmission of a visitor response message having a data configuration as shown in FIG. 5 successively until the timer expires (310 to 312). When receiving the visitor response message (311), the subscriber packet exchange apparatus 3a stores the visitor response message as a link to the mobile terminal 8b (314).

Like that of embodiment 2, after that, when receiving the next data packet "2" (316) that is transmitted from the source mobile terminal 8a to the destination mobile terminal 8b, the subscriber packet exchange apparatus 3a determines a link via which the next data packet should be transmitted (317), as in the case of receiving the first data packet "1". In this case, because the subscriber packet exchange apparatus 3a has already found out the visitor routing destination with the visitor response message, the subscriber packet exchange apparatus 3a encapsulates the next data packet with a unicast address (319) without making copies of the data packet whose number is equal to the number of needed links (318), and transfers the encapsulated data packet "2" only to the subscriber packet exchange apparatus 3b which is the visitor routing destination (320).

When receiving the data packet "2" encapsulated with the unicast address, the subscriber packet exchange apparatus 3b performs the same processing on the received data packet "2", as that performed on the data packet "1" encapsulated with the multicast address (321, 322), and transfers the decapsulated data packet "2" to the destination mobile terminal 8b (323).

When transferring the data packet "2" to the destination mobile terminal 8b, the subscriber packet exchange apparatus 3b doesn't acquire the visitor information from the visitor location register 4b, as shown in FIG. 6. This is because the visitor information acquired when transferring the first data packet "1" has been cached. In contrast, when the visitor information has not been cached, the subscriber packet exchange apparatus 3b acquires the visitor information in the same manner that it does when transferring the data packet "1" (307, 308).

As mentioned above, in accordance with this embodiment 3, a subscriber packet exchange apparatus that has received a packet that is encapsulated with a multicast address and that is to be sent to a mobile terminal that is a destination starts a timer when transmitting a visitor response message to another subscriber packet exchange apparatus that is a sending source and repeatedly transmits the visitor response message to the other subscriber packet exchange apparatus until the timer expires. Therefore, the other subscriber packet exchange apparatus that has received a data packet from the source mobile terminal can route the data packet directly to the subscriber packet exchange apparatus that manages a routing area in which the destination mobile terminal is currently located. In addition, the subscriber packet exchange apparatus that is the destination continuously transmits the visitor response message under control of the timer, the other subscriber packet exchange apparatus that is the sending source can surely receive the visitor response message. Furthermore, when transferring the following data packets, the other subscriber packet exchange apparatus can encapsulate them with a unicast address in response to the visitor response message transmitted from the subscriber packet exchange apparatus that is the destination and can surely receive the visitor response message, thereby reducing the amount of signals being transmitted in the mobile IP packet communication system. The mobile IP packet communication system can also carry out the transmission of packets between the source and destination mobile terminals with efficiency while reducing the transfer delay.

Embodiment 4

In a mobile IP packet communication system in accordance with this embodiment 4, after transferring a packet transmitted thereto from a mobile terminal that is a sending source to another subscriber packet exchange apparatus to which a destination mobile terminal belongs by encapsulating the packet with a multicast address, a subscriber packet exchange apparatus provides a status notification region for notification of communication status in a header region of each following packet in advance, when receiving a response message from the other subscriber packet exchange apparatus to which the destination mobile terminal belongs, notifies the other subscriber packet exchange apparatus that is the destination that the subscriber packet exchange apparatus has already received the response message by using the status notification region of each following packet. Hereafter, the mobile IP packet communication system in accordance with this embodiment 4 will be explained with reference to drawings.

The mobile IP packet communication system in accordance with this embodiment 4 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 4 are as shown in FIG. 3.

Figure 7:
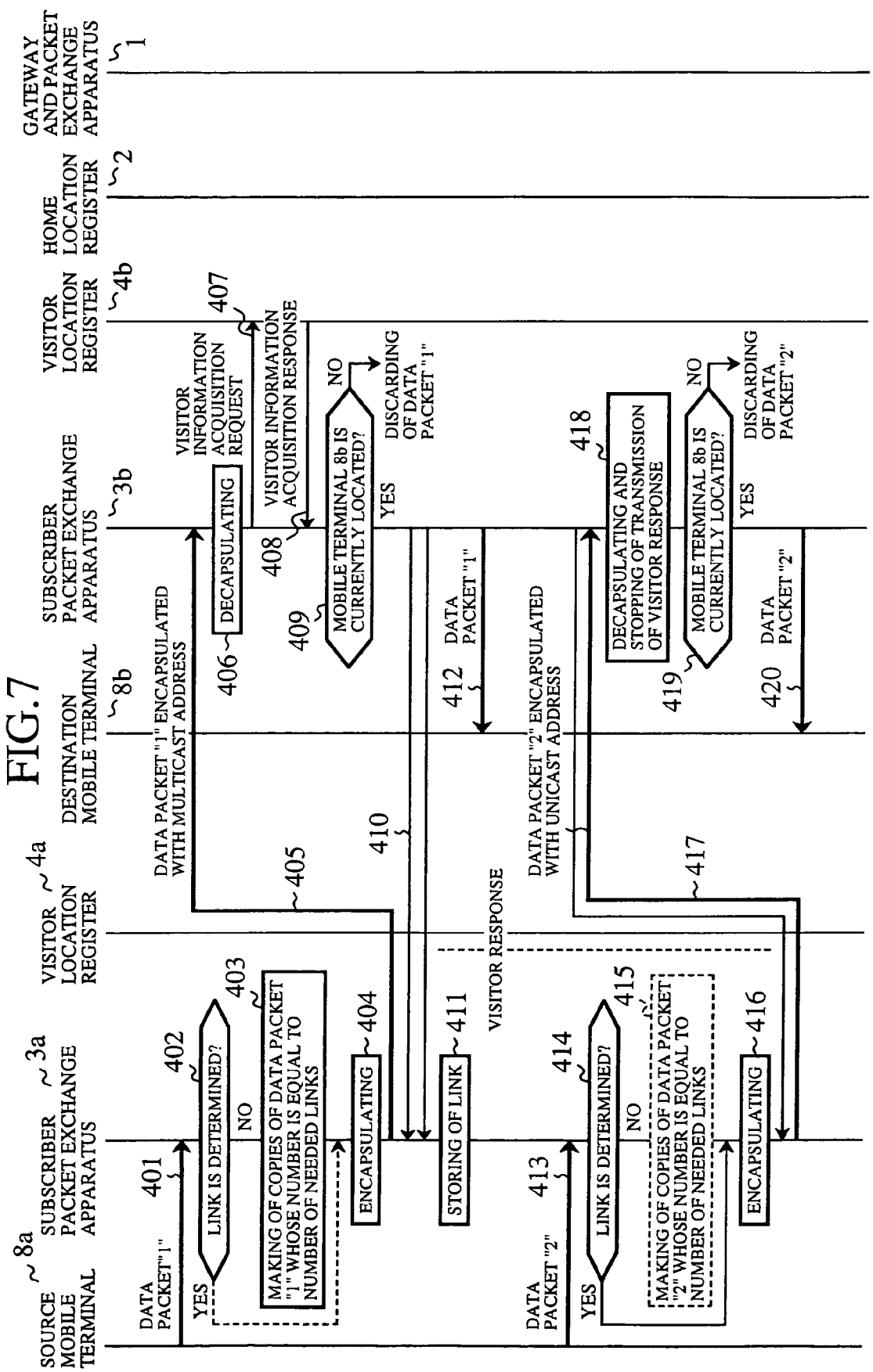
FIG. 7 is a sequence diagram for explaining an operation of a mobile IP packet communication system in accordance with embodiment 4 of the present invention.

FIG. 7 is a sequence diagram for explaining an operation of the mobile IP packet communication system in accordance with embodiment 4 of the present invention. The operation of the mobile IP packet communication system in accordance with this embodiment 4 will be explained hereafter with reference to the sequence diagram of FIG. 7.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (401) that is sent from the source mobile terminal 8*a* to the destination mobile terminal 8*b*, the subscriber packet exchange apparatus 3*a* determines a link via which this data packet "1" should be sent out (402). Because the subscriber packet exchange apparatus 3*a* is not sure in which routing area the destination mobile terminal 8*b* is currently located, after making only a number of copies of the first data packet "1" whose number is equal to the number of needed links (403), as in the case of embodiments 1 to 3, and encapsulating the number of data packets "1" with a multicast address (404), the subscriber packet exchange apparatus 3*a* transfers the number of data packets encapsulated to other subscriber packet exchange apparatuses other than subscriber packet exchange apparatus 3*a* itself (405).

When receiving the data packet "1" encapsulated with the multicast address, the subscriber packet exchange apparatus 3*b* retrieves the data packet "1" destined for the mobile terminal 8*b* by decapsulating the encapsulated data packets (406), and acquires the visitor information on the mobile terminal 8*b* from a visitor location register 4*b* (407, 408). The subscriber packet exchange apparatus 3*b* then determines whether or not the destination mobile terminal 8*b* is currently located in a routing zone managed thereby (409), and, when determining that the mobile terminal 8*b* is currently located in a routing zone managed thereby and then identifying the routing zone, transfers the data packet "1" to the destination mobile terminal 8*b* by way of a radio base station and a base station control apparatus thereof (412).

Figure 8:
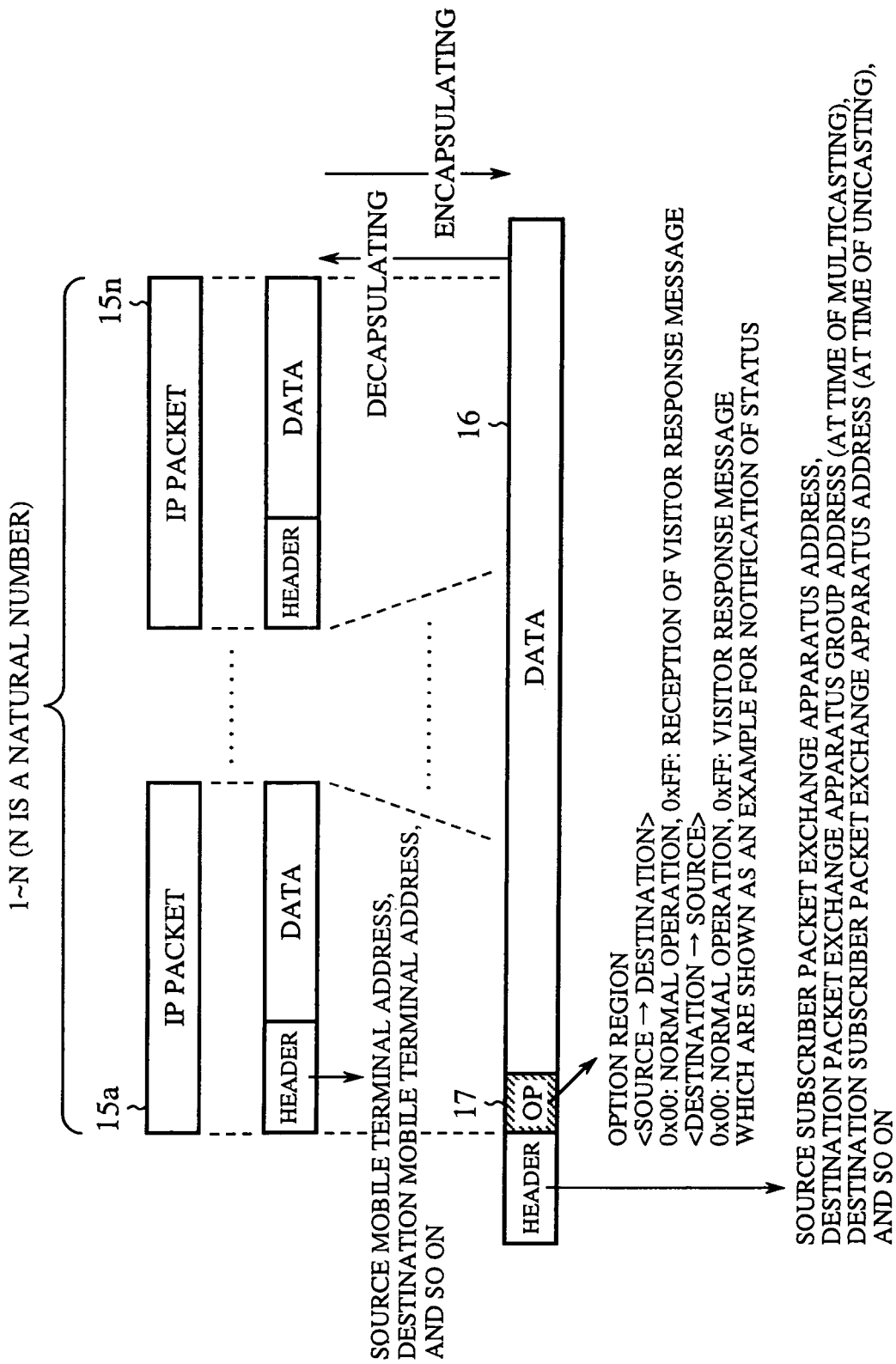
FIG. 8 is explanatory drawing showing the format of user packets each having an option region for notification of communication status and transferred between a packet data gateway apparatus and packet data support apparatuses and between the packet data support apparatuses in accordance with the present invention.

At this time, the subscriber packet exchange apparatus 3*b* continuously transmits a visitor response message having a data configuration as shown in FIG. 5 to the subscriber packet exchange apparatus 3*a* that has transmitted the encapsulated data packets "1" thereto until receiving another data packet transmitted between the subscriber packet exchange apparatuses, which indicates that the subscriber packet exchange apparatus 3*a* has received the visitor response message (410). FIG. 8 shows the format of user packets transferred between a gateway and packet data exchange apparatus (i.e., packet data gateway apparatus) and the subscriber packet exchange apparatuses (i.e., packet data support apparatuses) and between the subscriber packet exchange apparatuses at that time. The format as shown in FIG. 8 differs from that as shown in FIG. 3 in that the encapsulated packet shown in FIG. 8 has an option region 17 (i.e., a region intended for notification of communication status) used for notification of communication status in the header region of the data frame 16. The notification: "The subscriber packet exchange apparatus 3*a* has received the visitor response message" is made by using this option region 17.

When receiving the visitor response message (410), the subscriber packet exchange apparatus 3*a* stores the visitor response message as a link to the mobile terminal 8*b* (411). Like that of embodiment 2 or 3, after that, when receiving the next data packet "2" (413) that is transmitted from the source mobile terminal 8*a* to the destination mobile terminal 8*b*, the subscriber packet exchange apparatus 3*a* determines a link via which the next data packet "2" should be transmitted (414), as in the case of receiving the first data packet "1". In this case, because the subscriber packet exchange apparatus 3*a* has already found out the visitor routing destination with the visitor response message, the subscriber packet exchange apparatus 3*a* encapsulates the next data packet "2" with a unicast address (416) without making copies of the data packet whose number is equal to the number of needed links (415), and transfers the encapsulated data packet "2" only to the subscriber packet exchange apparatus 3*b* which is the visitor routing destination (417). Because the subscriber packet exchange apparatus 3*a* has already received the visitor response message at the time of this transfer, the subscriber packet exchange apparatus 3*a* notifies that it has already received the visitor response message by using the option region 17 of the data packet "2" as shown in FIG. 8.

When receiving the data packet "2" encapsulated with the unicast address, the subscriber packet exchange apparatus 3*b* decapsulates the received data packet "2", as in the case where it has received the data packet "1", and also performs a process of stopping the continuous transmission of the visitor response message (418) because it is notified that the subscriber packet exchange apparatus 3*a* has already received the visitor response message through the option region 17 of the received data packet. After that, the subscriber packet exchange apparatus 3*b* determines whether or not the destination mobile terminal 8*b* is currently located in a routing zone managed thereby (419), and, when determining that the destination mobile terminal 8*b* is currently located in a routing zone managed thereby and identifying the routing zone, then transfers the data packet "2" to the mobile terminal 8*b* (419, 420).

When transferring the data packet "2" to the destination mobile terminal 8*b*, the subscriber packet exchange apparatus 3*b* doesn't acquire the visitor information from the visitor location register 4*b*, as shown in FIG. 7. This is because the visitor information acquired when transferring the first data packet "1" has been cached. In contrast, when the visitor information has not been cached, the subscriber packet exchange apparatus 3*b* acquires the visitor information in the same manner that it does when transferring the data packet "1" (407, 408).

As mentioned above, in accordance with this embodiment 4, a subscriber packet exchange apparatus provides an option region for notification of communication status in the header region of each of packets to be transferred in advance, and, when receiving a visitor response message from another subscriber packet exchange apparatus to which a mobile terminal that is a destination belongs, notifies the other subscriber packet exchange apparatus that is the destination that the subscriber packet exchange apparatus has already received the visitor response message by using the option region. Therefore, the subscriber packet exchange apparatus that has received a data packet from the source mobile terminal can route the data packet directly to the other subscriber packet exchange apparatus that manages a routing area in which the destination mobile terminal is currently located. In addition, because the other subscriber packet exchange apparatus that is the destination continuously transmits the visitor response message until receiving a notification of the reception of the visitor response message, the subscriber packet exchange apparatus that is the sending source can surely receive the visitor response message. Furthermore, when transferring the following data packets, the subscriber packet exchange apparatus can encapsulate them with a unicast address in response to the visitor response message transmitted from the other subscriber packet exchange apparatus that is the destination and can surely receive the visitor response message, thereby reducing the amount of signals being transmitted in the mobile IP packet communication system. The mobile IP packet communication system can also carry out the transmission of packets between the source and destination mobile terminals with efficiency while reducing the transfer delay.

Embodiment 5

In a mobile IP packet communication system in accordance with this embodiment 5, in case where a mobile terminal that is a destination transmits a packet to another mobile terminal that is a sending source when a subscriber packet exchange apparatus that is a destination transmits a visitor response message to another subscriber packet data exchange that is a sending source, the subscriber packet exchange apparatus transfers the packet from the destination mobile terminal to the source mobile terminal by superimposing information corresponding to the visitor response message on the packet. Hereafter, the mobile IP packet communication system in accordance with this embodiment 5 will be explained with reference to drawings.

The mobile IP packet communication system in accordance with this embodiment 5 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system are as shown in FIG. 3.

Figure 9:
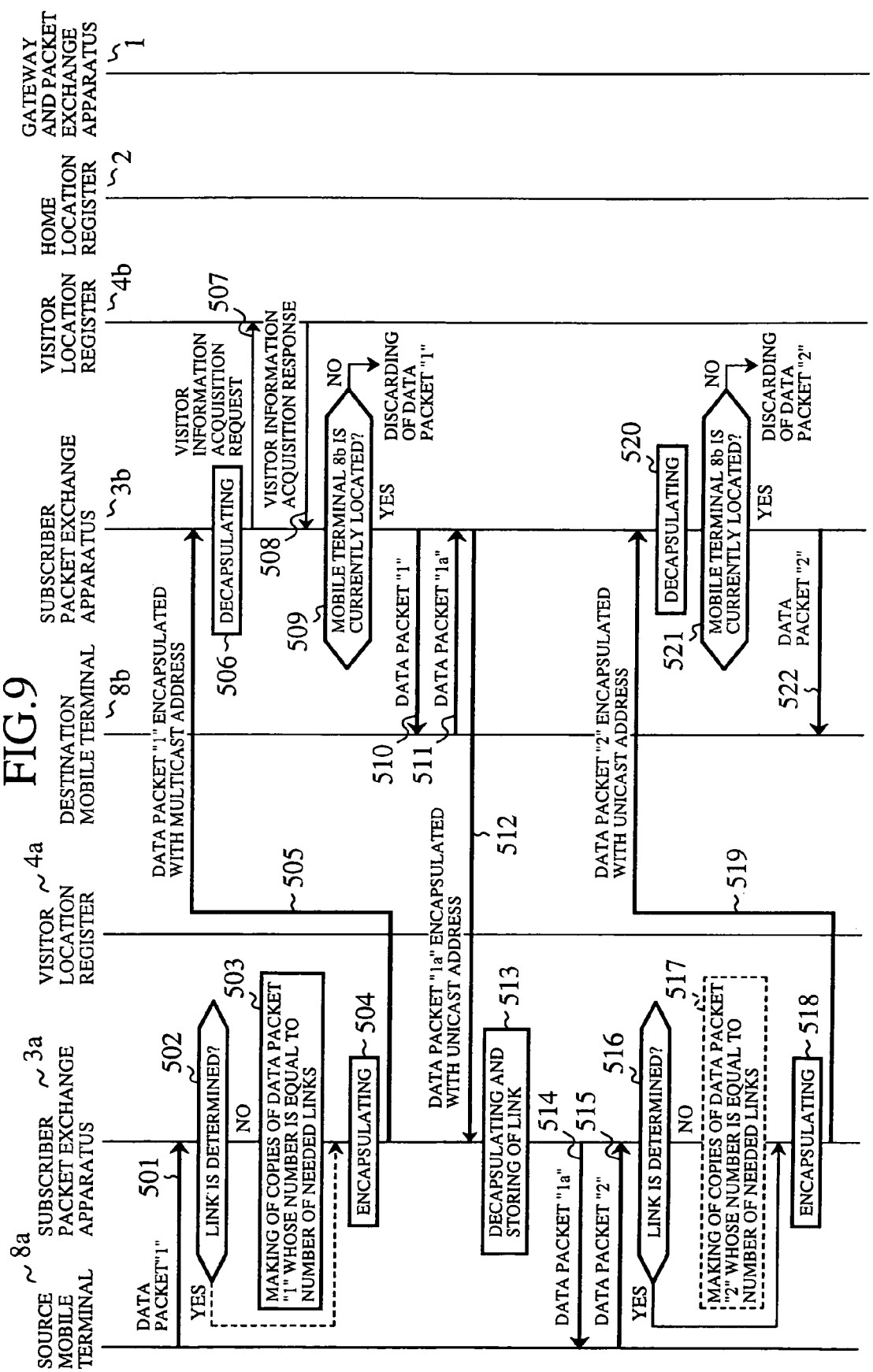
FIG. 9 is a sequence diagram for explaining an operation of a mobile IP packet communication system in accordance with embodiment 5 of the present invention.

FIG. 9 is a sequence diagram for explaining an operation of the mobile IP packet communication system in accordance with embodiment 5 of the present invention. The operation of the mobile IP packet communication system in accordance with this embodiment 5 will be explained hereafter with reference to the sequence diagram of FIG. 9.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (501) that is sent from the source mobile terminal 8a to the destination mobile terminal 8b, the subscriber packet exchange apparatus 3a determines a link via which the data packet "1" should be sent out (502). Because the subscriber packet exchange apparatus 3a is not sure in which routing area the destination mobile terminal 8b is currently located, after making only a number of copies of the first data packet "1" whose number is equal to the number of needed links (503), as in the case of embodiments 1 to 4, and encapsulating the number of data packets "1" with a multicast address (504), the subscriber packet exchange apparatus 3a transfers the number of data packets encapsulated to other subscriber packet exchange apparatuses other than subscriber packet exchange apparatus 3a itself (505).

The subscriber packet exchange apparatus 3b that has received the data packet "1" encapsulated with the multicast address retrieves the data packet "1" destined for the mobile terminal 8b by decapsulating the encapsulated data packets (506), and acquires the visitor information on the mobile terminal 8b from a visitor location register 4b (507, 508). The subscriber packet exchange apparatus 3b then determines whether or not the destination mobile terminal 8b is currently located in a routing zone managed thereby (509), and, when determining that the mobile terminal 8b is currently located in a routing zone managed thereby and then identifying the routing zone, transfers the data packet "1" to the destination mobile terminal 8b by way of a radio base station and a base station control apparatus thereof (510).

When transmission of a data packet "1a" from the destination mobile terminal 8b to the source mobile terminal 8a is carried out immediately after the transfer of the data packet "1" to the destination mobile terminal 8b, the subscriber packet exchange-apparatus 3b carries out the transfer of this data packet "1a" to the subscriber packet exchange apparatus 3a without performing the sending back of the visitor response message to the subscriber packet exchange apparatus 3a, which is explained in Embodiments 2 to 4. In this transfer processing, because the subscriber packet exchange apparatus 3b is notified that the source mobile terminal 8a is currently located in the routing area 13a managed by the subscriber packet exchange apparatus 3a when transferring the previous data packet "1", the subscriber packet exchange apparatus 3b that has received the data packet "1a" from the destination mobile terminal 8b encapsulates the data packet "1a" with a unicast address in the format in which the visitor response message is placed in the option region 17 of the data packet, as shown in FIG. 8, and transfers the data packet "1a" to the subscriber packet exchange apparatus 3a (512).

When receiving the data packet "1a" encapsulated with the unicast address, the subscriber packet exchange apparatus 3a decapsulates the data packet "1a" and also stores a link to the mobile terminal 8b because the visitor response is shown by the option region 17 of the received data packet (513). The subscriber packet exchange apparatus 3a then transmits the decapsulated data packet "1a" to the source mobile terminal 8a (514).

Like those of embodiments 2 to 4, after that, when receiving the next data packet "2" (515) that is transmitted from the source mobile terminal 8a to the destination mobile terminal 8b, the subscriber packet exchange apparatus 3a determines a link via which the next data packet should be transmitted (516), as in the case of receiving the first data packet "1". At this time, because the subscriber packet exchange apparatus 3a has already found out the visitor routing destination with the visitor response, the subscriber packet exchange apparatus 3a encapsulates the next data packet with a unicast address without making copies of the data packet whose number is equal to the number of needed links (517), and transfers the encapsulated data packet "2" only to the subscriber packet exchange apparatus 3b which is the visitor routing destination (519). Because the subscriber packet exchange apparatus 3a has already received the visitor response message at the time of this transfer, the subscriber packet exchange apparatus 3a notifies that it has already received the visitor response message by using the option region 17 of the encapsulated data packet "2", as shown in FIG. 8.

When receiving the data packet "2" encapsulated with the unicast address, the subscriber packet exchange apparatus 3b decapsulates the received data packet "2" (520), as in the case where it has received the data packet "1". After that, the subscriber packet exchange apparatus 3b determines whether or not the destination mobile terminal 8b is currently located in a routing zone managed thereby (521), and, when determining that he destination mobile terminal 8b is currently located in a routing zone and identifying the routing zone, then transfers the data packet "2" to the mobile terminal 8b (522).

When transferring the data packet "2" to the destination mobile terminal 8b, the subscriber packet exchange apparatus 3b doesn't acquire the visitor information from the visitor location register 4b, as shown in FIG. 9. This is because the visitor information acquired when transferring the first data packet "1" has been cached. In contrast, when the visitor information has not been cached, the subscriber packet exchange apparatus 3*b* acquires the visitor information in the same manner that it does when transferring the data packet "1" (507, 508).

As mentioned above, in accordance with this embodiment 5, in case where a mobile terminal that is a destination transmits a packet to another mobile terminal that is a sending source when a subscriber packet exchange apparatus that is a destination transmits a visitor response message to another subscriber packet data exchange that is a sending source, the subscriber packet exchange apparatus transfers the packet from the destination mobile terminal to the source mobile terminal by superimposing information corresponding to the visitor response message on the packet. Therefore, the other subscriber packet exchange apparatus that has received a data packet from the source mobile terminal can route the data packet directly to the subscriber packet exchange apparatus that manages a routing area in which the destination mobile terminal is currently located. In addition, because the subscriber packet exchange apparatus that is the destination transmits a packet that is sent from the destination mobile terminal to the source mobile terminal by superimposing information corresponding to the visitor response message on the packet, when transferring the following data packets from the source mobile terminal to the destination mobile terminal, the other subscriber packet exchange apparatus can encapsulate them with a unicast address, thereby reducing the amount of signals being transmitted in the mobile IP packet communication system without having to use the visitor response message. The mobile IP packet communication system can also carry out the transmission of packets between the source and destination mobile terminals with efficiency while reducing the transfer delay.

Embodiment 6

In a mobile IP packet communication system in accordance with this embodiment 6, when transferring a packet received from a mobile terminal that is a sending source to either another subscriber packet exchange apparatus to which another mobile terminal that is a destination belongs or an external packet data network to which a fixed terminal that is a sending destination belongs, a subscriber packet exchange apparatus determines whether the packet is destined for either the other mobile terminal or the fixed terminal, encapsulates the packet with a multicast address when the packet is destined for the other mobile terminal, and transfers the packet to the other subscriber packet exchange apparatus to which the destination mobile terminal belongs. Hereafter, the mobile IP packet communication system in accordance with this embodiment 6 will be explained with reference to drawings.

The mobile IP packet communication system in accordance with this embodiment 6 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment are as shown in FIG. 3.

Figure 10:
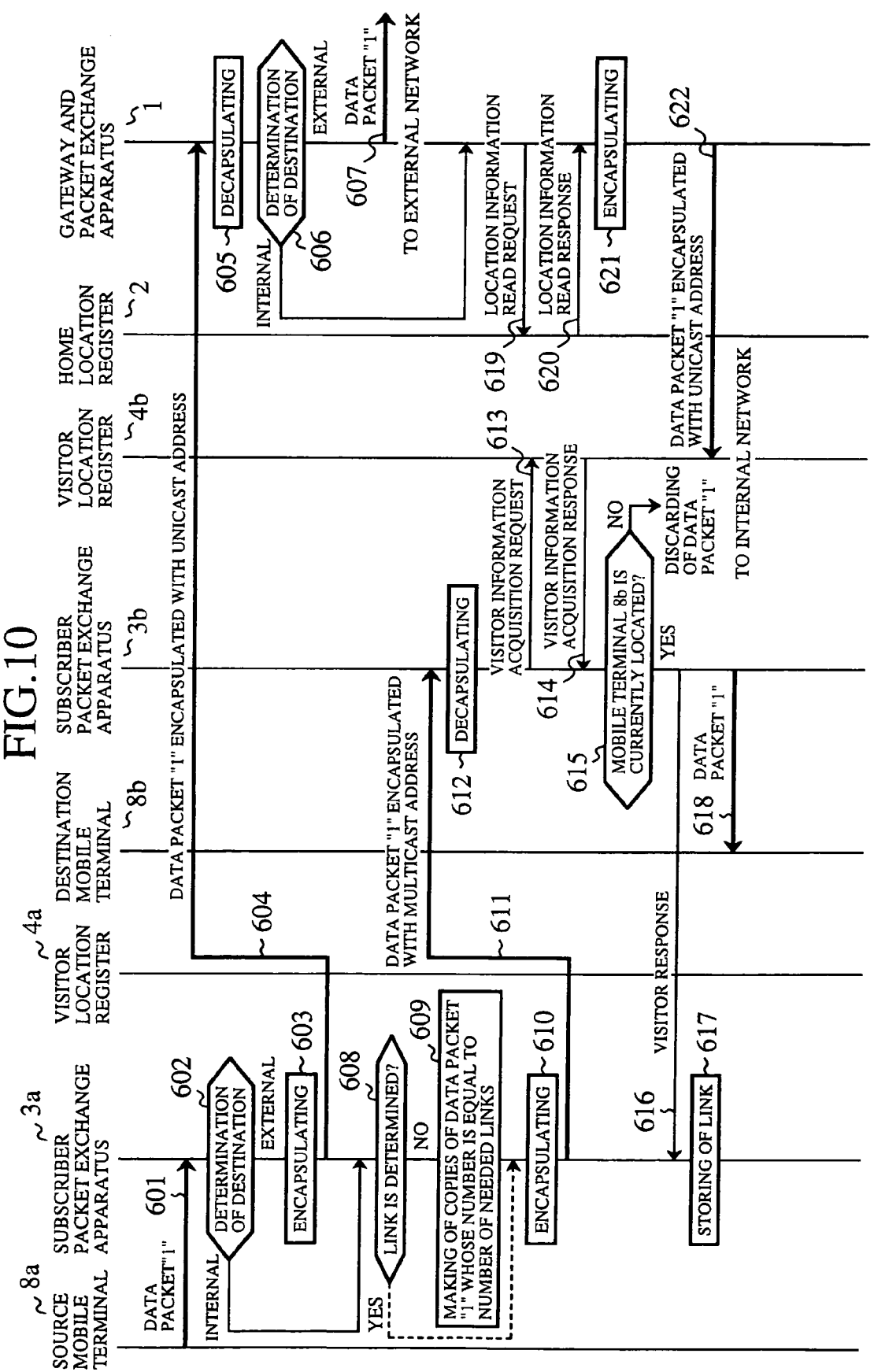
FIG. 10 is a sequence diagram for explaining an operation of a mobile IP packet communication system in accordance with embodiment 6 of the present invention.

FIG. 10 is a sequence diagram for explaining an operation of the mobile IP packet communication system in accordance with embodiment 6 of the present invention. The operation of the mobile IP packet communication system in accordance with this embodiment 6 will be explained hereafter with reference to the sequence diagram of FIG. 10.

A procedure for registering the locations of a mobile terminal 8*a* that is a sending source and another mobile terminal 8*b* that is a destination is carried out in the same manner as explained in Embodiment 1 (101 to 108), and therefore the explanation of the procedure will be omitted hereafter.

When receiving a data packet "1" (601) that is sent from the source mobile terminal 8*a* to the destination mobile terminal 8*b*, a subscriber packet exchange apparatus 3*a* determines a link via which the data packet "1" should be sent (602). At this time, the subscriber packet exchange apparatus 3*a* determines whether the received data packet "1" should be transferred to either an external packet data network 9 such as an internet or intranet or an internal mobile IP packet communication network based on the destination address of the received data packet.

When determining that the received data packet "1" should be transferred to a fixed terminal 10 connected with the external packet data network 9, the subscriber packet exchange apparatus 3*a* encapsulates the received data packet "1" with a unicast address and transfers the encapsulated data packet "1" to a gateway and packet data exchange apparatus 1 (603, 604). When receiving this encapsulated data packet "1", the gateway and packet data exchange apparatus 1 decapsulates the data packet and determines the address of the data packet "1" (606). When determining that the data packet "1", is destined for the fixed terminal 10 connected with the external packet data network 9, the gateway and packet data exchange apparatus 1 transfers this decapsulated data packet 1 to the external packet data network 9 (607).

In contrast, when determining that the data packet "1" is destined for the internal mobile IP packet communication network, the gateway and packet data exchange apparatus 1 sets the destination address as a key and inquires of a home location register 2 about a routing area in which the destination mobile terminal 8*b* is currently located (619, 620), and encapsulates the data packet "1" again with a unicast address according to the determination result (621) and transfers the encapsulated data packet "1" to a predetermined subscriber packet exchange apparatus (622).

On the other hand, when the subscriber packet exchange apparatus 3*a* determines that the received data packet "1" should be transferred to the internal mobile IP packet communication network, the subscriber packet exchange apparatus 3*a* makes only a number of copies of the data packet "1" whose number is equal to the number of needed links (609) after determining a link, encapsulates the number of duplicates of the data packet "1" by using a multicast group address of all other subscriber packet exchange apparatuses other than the subscriber packet exchange apparatus 3*a* itself (610), and transfers the encapsulated data packets "1" (611). After that, the system operates in the same manner that that of either of embodiments 1 to 5, does.

As mentioned above, in accordance with this embodiment 6, when transferring a packet received from a mobile terminal that is a sending source, a subscriber packet exchange apparatus determines whether the packet is destined for either another mobile terminal or a fixed terminal, and, when determining that the packet is destined for the fixed terminal, transfers the packet to a gateway and packet exchange apparatus without encapsulating the packet with a multicast address. Therefore, only when determining that a packet to be transferred is destined for another mobile terminal, the subscriber packet exchange apparatus encapsulates the packet with a multicast address and transfers the packet to another subscriber packet exchange apparatus to which the other mobile terminal that is a destination belongs. As a result, the subscriber packet exchange apparatus can route the data packet directly to the other subscriber packet exchange apparatus that manages a routing area in which the destination mobile terminal is currently located. The mobile IP packet communication system can also carry out the transmission of packets between the source and destination mobile terminals with efficiency while reducing the transfer delay.

Embodiment 7

In a mobile IP packet communication system in accordance with this embodiment 7, when transferring a packet received from a mobile terminal that is a sending source to either another subscriber packet exchange apparatus to which a mobile terminal that is a destination belongs or an external packet data network to which a fixed terminal that is a destination belongs, a subscriber packet exchange apparatus encapsulates the packet with a multicast address without determining whether the packet is destined for either the destination mobile terminal or the fixed terminal, and, when receiving the packet encapsulated with the multicast address and the packet is destined for the fixed terminal, a gateway and packet data exchange apparatus transfers the received packet to the destination fixed terminal after decapsulating the packet and transmits a visitor response message to the subscriber packet exchange apparatus that is the sending source of the packet.

Hereafter, the mobile IP packet communication system in accordance with this embodiment 7 will be explained with reference to drawings.

The mobile IP packet communication system in accordance with this embodiment 7 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 7 are as shown in FIG. 3.

Figure 11:
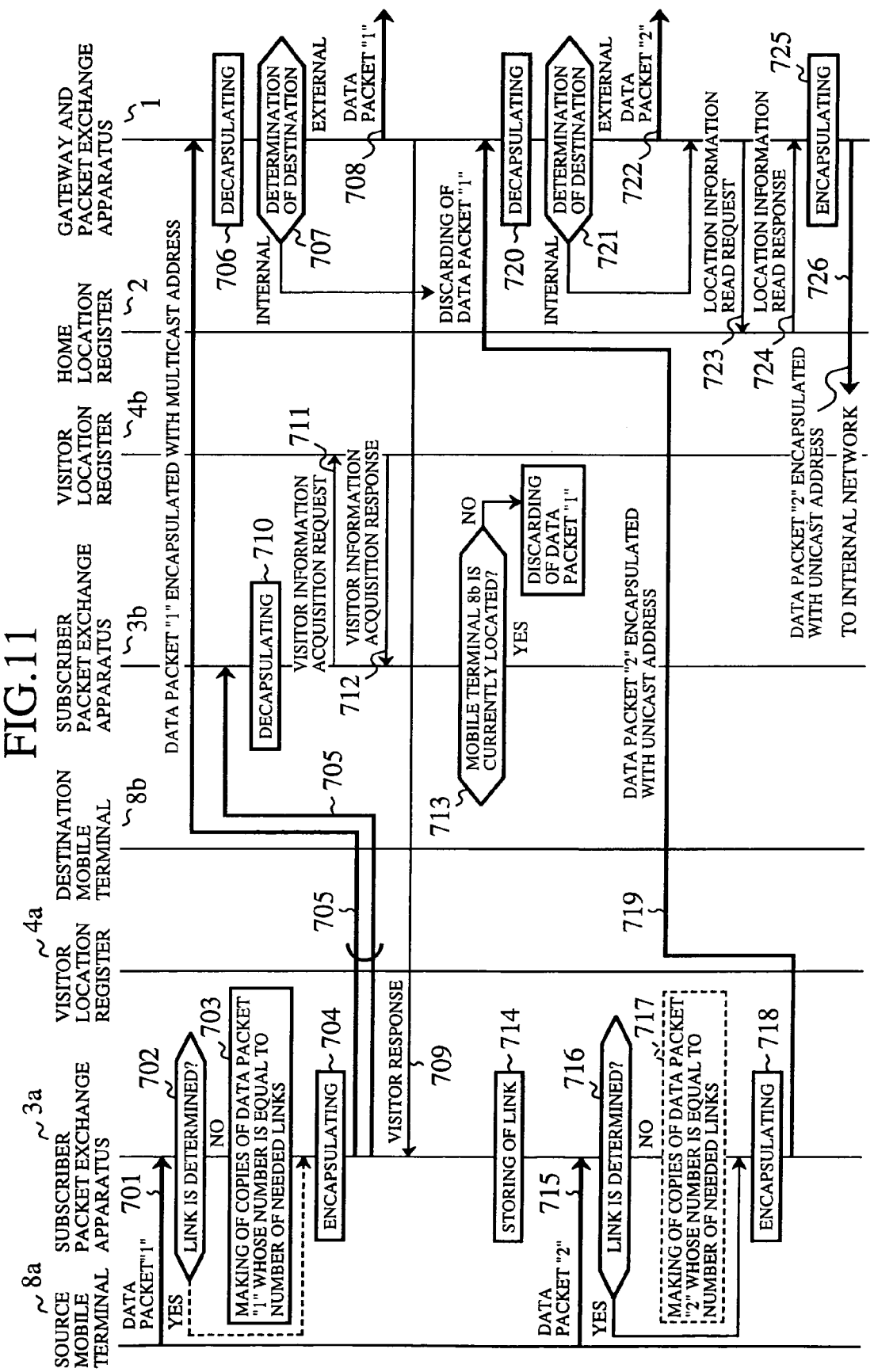
FIG. 11 is a sequence diagram for explaining an operation of a mobile IP packet communication system in accordance with embodiment 7 of the present invention.

FIG. 11 is a sequence diagram for explaining an operation of the mobile IP packet communication system in accordance with embodiment 7 of the present invention. The operation of the mobile IP packet communication system in accordance with this embodiment 7 will be explained hereafter with reference to the sequence diagram of FIG. 11.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter. When receiving the first data packet "1" (701) that is sent from the source mobile terminal 8a to the destination mobile terminal 8b, a subscriber packet exchange apparatus 3a determines a link via which the data packet "1" should be sent out (702). Because the subscriber packet exchange apparatus 3a is not sure whether the packet should be transferred to a routing destination in which the destination mobile terminal is currently located or to an external packet data network, after making only a number of copies of the first data packet "1" whose number is equal to the number of needed links (703), as in the case of embodiments 1 to 6, and encapsulating the number of data packets "1" with a multicast address (704), the subscriber packet exchange apparatus 3a transfers the number of data packets encapsulated to other subscriber packet exchange apparatuses other than subscriber packet exchange apparatus 3a itself (705).

When receiving the data packet "1" encapsulated with the multicast address, the gateway and packet data exchange apparatus 1 decapsulates the received data packet "1" (706) and determines the destination of the decapsulated data packet "1" (707). As a result, when determining that the data packet is destined for a fixed terminal 10 connected with an external packet data network 9, the gateway and packet data exchange apparatus 1 transfers the data packet "1" to the external packet data network 9 (708). At this time, the gateway and packet data exchange apparatus 1 transmits a visitor response message as shown in FIG. 5 to the subscriber packet exchange apparatus 3a that has transmitted the encapsulated data packet "1" thereto (709). In contrast, when determining that the data packet is destined for the internal mobile IP packet communication network after decapsulating the encapsulated data packet, the gateway and packet data exchange apparatus 1 discards the data packet "1" (because the data packet "1" encapsulated with the multicast address has already been multicasted to the internal mobile IP packet communication network, the gateway and packet data exchange apparatus 1 discards the data packet).

On the other hand, when receiving the data packet "1" encapsulated with the multicast address, the subscriber packet exchange apparatus 3b decapsulates the encapsulated data packet "1" (710) and acquires visitor information on the mobile terminal 8b from a visitor location register 4b (711, 712). The subscriber packet exchange apparatus 3b then determines whether or not the mobile terminal 8b is currently located in any zone managed thereby based on the visitor information (713), and discards the data packet "1" when the mobile terminal 8b is not currently located in any zone managed thereby.

When receiving the visitor response message (709) from the gateway and packet data exchange apparatus 1, the subscriber packet exchange apparatus 3a stores the visitor response message as a link to the fixed terminal 10 connected with the external packet data network 9 (714). When receiving the next data packet "2" (715) destined for the fixed terminal 10 connected with the external packet data network 9 from the source mobile terminal 8a, the subscriber packet exchange apparatus 3a determines a link via which the next data packet should be sent out (716), as in the case of receiving the first data packet "1". Because the subscriber packet exchange apparatus 3a has already determined the routing destination, the subscriber packet exchange apparatus 3a encapsulates the data packet "2" with a unicast address (718) without making copies of the data packet "2" whose number is equal to the number of needed links (717), and transfers the encapsulated data packet to only the gateway and packet data exchange apparatus 1 which is the routing destination (719).

When receiving the data packet "2" encapsulated with the unicast address, the gateway and packet data exchange apparatus 1 determine determines the destination of the data packet (721) after decapsulating the encapsulated data packet (720). As a result, when determining that the data packet is destined for the fixed terminal 10 connected with the external packet data network 9, the gateway and packet data exchange apparatus 1 transfers the data packet "2" to the external packet data network 9 (722). In contrast, when determining that the data packet is destined for the internal mobile IP packet communication network, the gateway and packet data exchange apparatus 1 sets the destination address as a key and inquires of a home location register 2 about a routing area in which the destination mobile terminal is currently located (723, 724). The gateway and packet data exchange apparatus 1 then encapsulates the data packet with the unicast address according to a response to the inquiry from the home location register (725), and transfers the data packet to a predetermined subscriber packet exchange apparatus (726).

As mentioned above, in accordance with this embodiment 7, when transferring a packet received from a mobile terminal that is a sending source to either another subscriber packet exchange apparatus to which another mobile terminal that is a destination belongs or an external packet data network to which a fixed terminal that is a destination belongs, a subscriber packet exchange apparatus encapsulates the packet with a multicast address without determining whether the packet is destined for either the other mobile terminal or the fixed terminal, and, when receiving the packet encapsulated with the multicast address and the packet is destined for the fixed terminal, a gateway and packet data exchange apparatus transfers the received packet to the destination fixed terminal after decapsulating the packet and transmits a visitor response message to the subscriber packet exchange apparatus that is the sending source of the packet. Therefore, the subscriber packet exchange apparatus can carry out the transmission of data packets without having to inquire about whether each packet to be transferred is destined for the destination mobile terminal or fixed terminal. The mobile IP packet communication system can also carry out the transmission of packets between the source and destination mobile terminals with efficiency while reducing the transfer delay.

Embodiment 8

In a mobile IP packet communication system in accordance with this embodiment 8, when transferring a packet received from a mobile terminal that is a sending source to either another subscriber packet exchange apparatus to which another mobile terminal that is a destination belongs or an external packet data network to which a fixed terminal that is a destination belongs, a subscriber packet exchange apparatus determines whether the packet is destined for either the destination mobile terminal or the fixed terminal, when determining that the packet is destined for the destination mobile terminal and the packet is to be transmitted through real-time packet communications, encapsulates the packet with a multicast address without acquiring location information on the location of the destination mobile terminal from either a home location register or a visitor location register. Hereafter, the mobile IP packet communication system in accordance with this embodiment 8 will be explained with reference to drawings.

The mobile IP packet communication system in accordance with this embodiment 8 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 8 are as shown in FIG. 3.

Figure 12:
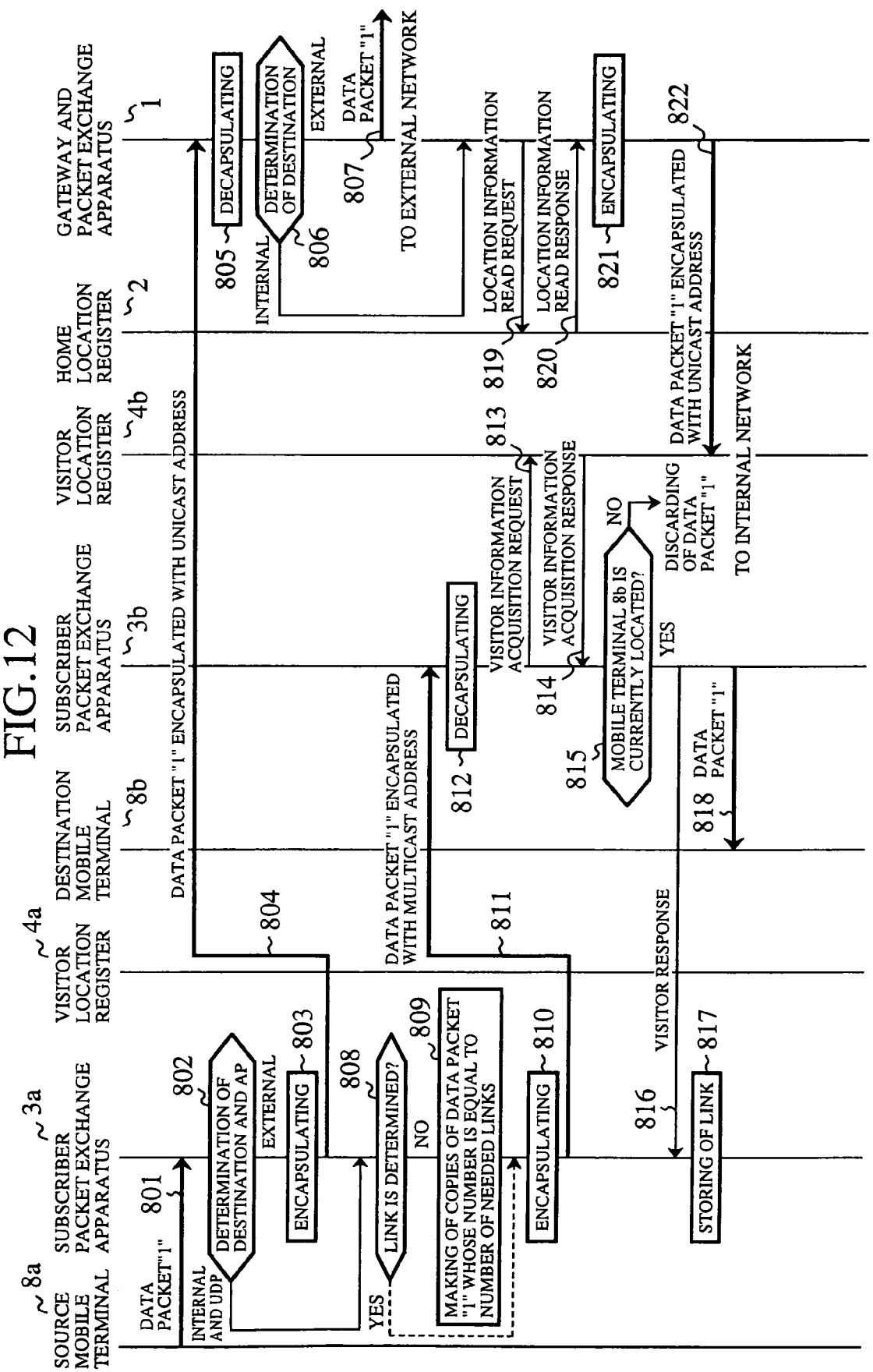
FIG. 12 is a sequence diagram for explaining an operation of a mobile IP packet communication system in accordance with embodiment 8 of the present invention.

FIG. 12 is a sequence diagram for explaining an operation of the mobile IP packet communication system in accordance with embodiment 8 of the present invention. The operation of the mobile IP packet communication system in accordance with this embodiment 8 will be explained hereafter with reference to the sequence diagram of FIG. 12.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (801) that is sent from the source mobile terminal 8a to the destination mobile terminal 8b, a subscriber packet exchange apparatus 3a determines a link via which the data packet "1" should be sent out (802). At this time, the subscriber packet exchange apparatus 3a determines whether the received data packet "1" should be transferred to either an external packet data network 9, such as an internet or intranet, or an internal mobile IP packet communication network from the destination address of the received data packet "1" and also determines whether or not the data packet is to be transmitted through real time communications.

When determining that the received data packet "1" should be transferred to the external packet data network 9 and that the data packet is to be transmitted through real time communications, the subscriber packet exchange apparatus 3a encapsulates the data packet with a unicast address (803) and transfers it to a gateway and packet data exchange apparatus 1 (804). When receiving this encapsulated data packet "1", the gateway and packet data exchange apparatus 1 decapsulates the received packet (805) and then determines the address of the received packet (806).

When determining that the received packet is destined for a fixed terminal 10 connected with the external packet data network 9, the gateway and packet data exchange apparatus 1 transfers the data packet "1" to the external packet data network 9 (807). In contrast, when determining that the data packet is destined for the internal mobile IP packet communication network, the gateway and packet data exchange apparatus 1 sets the destination address as a key and inquires of a home location register 2 about a routing area in which the destination mobile terminal is currently located (819, 820). The gateway and packet data exchange apparatus 1 then encapsulates the data packet with a unicast address according to a response to the inquiry from the home location register (821), and transfers the data packet to a predetermined subscriber packet exchange apparatus (822).

On the other hand, when determining that the received data packet "1" should be transferred to the internal mobile IP packet communication network and that the data packet is to be transmitted through real time communications, the subscriber packet exchange apparatus 3a makes only a number of copies of the data packet "1" whose number is equal to the number of needed links (809) after determining a link (808), encapsulates the number of copies of the data packet "1" by using a multicast group address of all other subscriber packet exchange apparatuses other than the subscriber packet exchange apparatus 3a itself (810), and transfers the encapsulated data packets "1" (811), as in the case of either of embodiments 1 to 7. After that, the system operates in the same manner that that of either of embodiments 1 to 7 does.

As mentioned above, in accordance with this embodiment 8, when transferring a packet received from a mobile terminal that is a sending source to either another subscriber packet exchange apparatus to which another mobile terminal that is a destination belongs or an external packet data network to which a fixed terminal that is a destination belongs, a subscriber packet exchange apparatus determines whether the packet is destined for either the destination mobile terminal or the fixed terminal, when determining that the packet is destined for the destination mobile terminal and the packet is to be transmitted through real-time packet communications, encapsulates the packet with a multicast address without acquiring location information on the location of the destination mobile terminal from either a home location register or a visitor location register and transfers the packet. Therefore, the subscriber packet exchange apparatus can route the data packet directly to another subscriber packet exchange apparatus that manages a routing area in which the destination mobile terminal is currently located. The mobile IP packet communication system can also carry out the transmission of packets between the source and destination mobile terminals with efficiency through real time communications while reducing the transfer delay.

Embodiment 9

In a mobile IP packet communication system in accordance with this embodiment 9, a gateway and packet data exchange apparatus that has received a packet encapsulated with a multicast address and destined for a fixed terminal that is a destination decapsulates the received packet and transfers the decapsulated packet to the destination fixed terminal, and starts a timer when transmitting a response message and repeatedly transmits the response message to a subscriber packet exchange apparatus that is the sending source of the packet until the timer expires, or repeatedly transmits the response message to the source subscriber packet exchange apparatus until being notified that the subscriber packet exchange apparatus has already received the response message through a status notification region located in a header region of each following packet. Hereafter, the mobile IP packet communication system in accordance with this embodiment 9 will be explained with reference to drawings.

The mobile IP packet communication system in accordance with this embodiment 9 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 9 are as shown in FIG. 3.

FIG. 13 is a sequence diagram for explaining an operation of the mobile IP packet communication system in accordance with embodiment 9 of the present invention. The operation of the mobile IP packet communication system in accordance with this embodiment 9 will be explained hereafter with reference to the sequence diagram of FIG. 13.

A procedure for registering the locations of a mobile terminal 8*a* that is a sending source and another mobile terminal 8*b* that is a destination is carried out in the same manner as explained in Embodiment 1 (101 to 108), and therefore the explanation of the procedure will be omitted hereafter.

When receiving the first data packet "1" (901) that is sent from the source mobile terminal 8*a* to the destination mobile terminal 8*b*, a subscriber packet exchange apparatus 3*a* determines a link via which the data packet "1" should be sent out (902). Because the subscriber packet exchange apparatus 3*a* is not sure whether the packet should be transferred to either a routing destination in which the destination mobile terminal is currently located or to an external packet data network, after making only a number of copies of the first data packet "1" whose number is equal to a number of needed links (903), as in the case of embodiment 1, and encapsulating the number of data packets "1" with a multicast address (904), the subscriber packet exchange apparatus 3*a* transfers the number of data packets encapsulated to other subscriber packet exchange apparatuses other than subscriber packet exchange apparatus 3*a* itself (905).

When receiving the data packet "1" encapsulated with the multicast address, the gateway and packet data exchange apparatus 1 decapsulates the received data packet "1" (906) and determines the destination of the decapsulated data packet "1" (907). As a result, when determining that the data packet is destined for a fixed terminal 10 connected with an external packet data network 9, the gateway and packet data exchange apparatus 1 transfers the data packet "1" to the external packet data network 9 (908). At this time, the gateway and packet data exchange apparatus 1 starts a timer (909) for the subscriber packet exchange apparatus 3*a* that has transmitted the encapsulated data packet "1" thereto and repeatedly performs transmission of a visitor response message having a data configuration as shown in FIG. 5 (190) to the subscriber packet exchange apparatus 3*a* until the timer expires or until being notified that the subscriber packet exchange apparatus 3*a* has received the visitor response message through a region included in a header region as shown in FIG. 8 and intended for notification of communication status. Referring to FIG. 13, there is illustrated a case where the visitor response message is repeatedly transmitted between the instant when the timer is started up and the instant when the timer expires.

In contrast, when determining that the data packet is destined for an internal mobile IP packet communication network (907), the gateway and packet data exchange apparatus 1 discards the data packet "1" (because the data packet "1" encapsulated with the multicast address has already been multicasted to the internal mobile IP packet communication network, the gateway and packet data exchange apparatus 1 discards the data packet).

On the other hand, when receiving the data packet "1" encapsulated with the multicast address from the source subscriber packet exchange apparatus 3*a*, the subscriber packet exchange apparatus 3*b* decapsulates the encapsulated data packet "1" (911) and acquires visitor information on the mobile terminal 8*b* from a visitor location register 4*b* (912, 913). The subscriber packet exchange apparatus 3*b* then determines whether or not the destination mobile terminal 8*b* is currently located in any routing zone managed thereby based on the visitor information (914), and discards the data packet "1" when the mobile terminal 8*b* is not currently located in any routing zone managed thereby.

When receiving the visitor response message (909) from the gateway and packet data exchange apparatus 1, the subscriber packet exchange apparatus 3*a* stores the visitor response message as a link to the fixed terminal 10 connected with the external packet data network 9 (915). When receiving the next data packet "2" (916) destined for the fixed terminal 10 connected with the external packet data network 9 from the source mobile terminal 8*a*, the subscriber packet exchange apparatus 3*a* determines a link via which the next data packet should be sent out (917), as in the case of receiving the first data packet "1". Because the subscriber packet exchange apparatus 3*a* has already determined the routing destination from the visitor response message, the subscriber packet exchange apparatus 3*a* encapsulates the data packet "2" with a unicast address (919) without making copies of the data packet "2" whose number is equal to a number of needed links (918), and transfers the encapsulated data packet to only the gateway and packet data exchange apparatus 1 which is the routing destination (920).

When receiving the data packet "2" encapsulated with the unicast address, the gateway and packet data exchange apparatus 1 determines the destination of the data packet (922) after decapsulating the encapsulated data packet (921). As a result, when determining that the data packet is destined for the fixed terminal 10 connected with the external packet data network 9, the gateway and packet data exchange apparatus 1 transfers the data packet "2" to the external packet data network 9 (923). In contrast, when determining that the data packet is destined for the internal mobile IP packet communication network, the gateway and packet data exchange apparatus 1 sets the destination address as a key and inquires of a home location register 2 about the routing area in which the destination mobile terminal is currently located (924, 925). The gateway and packet data exchange apparatus 1 then encapsulates the data packet with a unicast address according to a response to the inquiry from the home location register (926), and transfers it to a predetermined subscriber packet exchange apparatus (927).

As mentioned above, in accordance with this embodiment 9, the gateway and packet data exchange apparatus that has received a packet encapsulated with a multicast address and destined for a fixed terminal that is a destination decapsulates the received packet and transfers the decapsulated packet to the destination fixed terminal, and starts a timer when transmitting a response message and repeatedly transmits the response message to a subscriber packet exchange apparatus that is the sending source of the packet until the timer expires, or repeatedly transmits the response message to the source subscriber packet exchange apparatus until being notified that the subscriber packet exchange apparatus has already received the response message through a status notification region located in a header region of each following packet. Therefore, the subscriber packet exchange apparatus can carry out the transmission of data packets without having to inquire about whether each data packet is destined for either a mobile terminal or a fixed terminal, and the mobile IP packet communication system can surely transmit the visitor response message between the source and destination subscriber packet exchange apparatuses, thereby reducing the amount of signals being transmitted in the mobile IP packet communication system. The mobile IP packet communication system can also carry out the transmission of packets between the source and destination mobile terminals with efficiency while reducing the transfer delay.

Embodiment 10

In a mobile IP packet communication system in accordance with this embodiment 10, in case where a fixed terminal that is a destination transmits a packet to a mobile terminal that is sending source when a gateway and packet exchange apparatus transmits a response message indicating that the fixed terminal that is a destination is connected with a network managed thereby to another subscriber packet exchange apparatus that is a sending source, the gateway and packet exchange apparatus transfers the packet from the destination fixed terminal to the source mobile terminal by superimposing the response message on the packet. Hereafter, the mobile IP packet communication system in accordance with this embodiment 10 will be explained with reference to drawings.

The mobile IP packet communication system in accordance with this embodiment 10 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 10 are as shown in FIG. 3.

Figure 14:
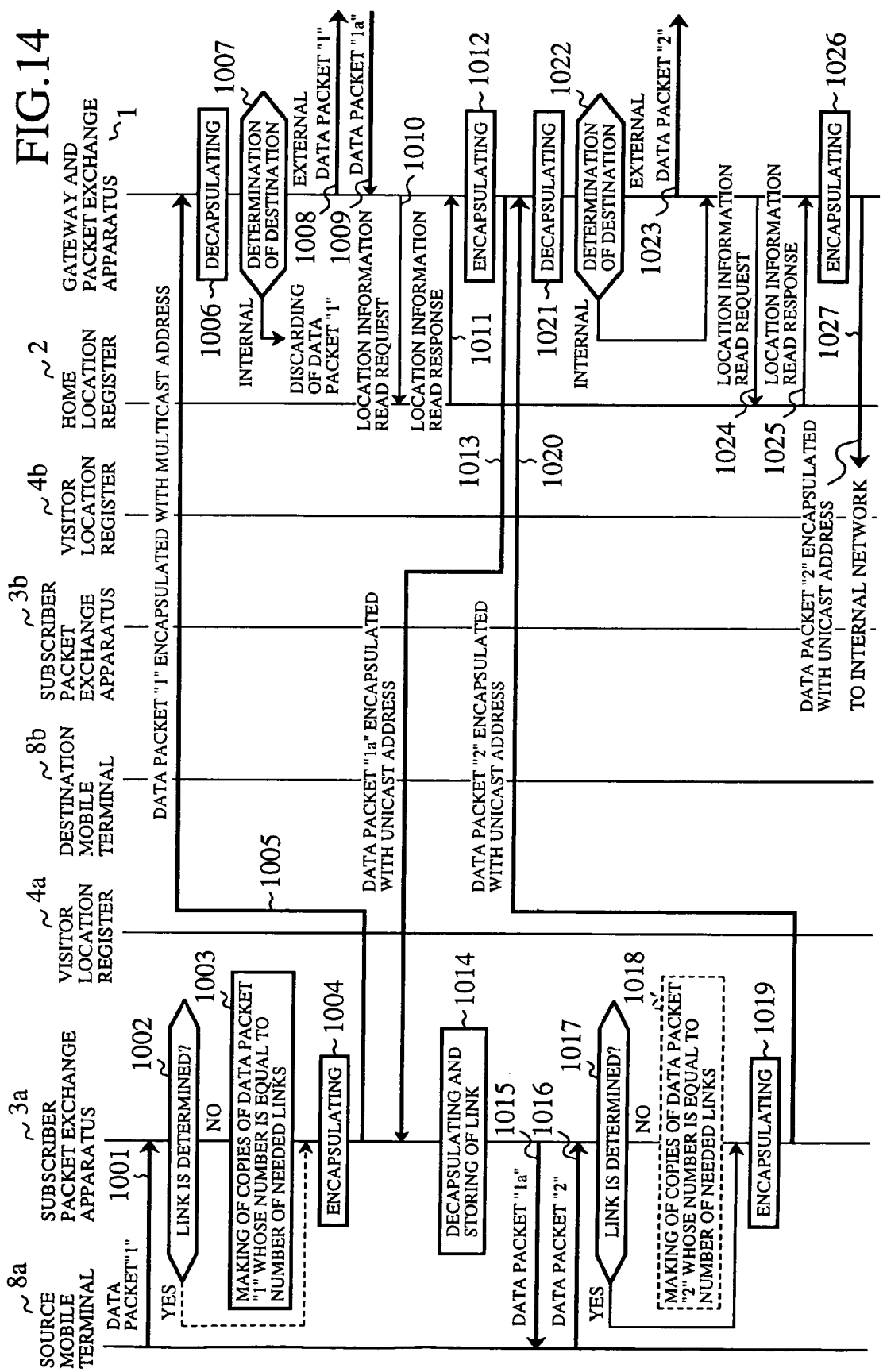
FIG. 14 is a sequence diagram for explaining an operation of a mobile IP packet communication system in accordance with embodiment 10 of the present invention.

FIG. 14 is a sequence diagram for explaining an operation of the mobile IP packet communication system in accordance with embodiment 10 of the present invention. The operation of the mobile IP packet communication system in accordance with this embodiment 10 will be explained hereafter with reference to the sequence diagram of FIG. 14.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (1001) that is sent from the source mobile terminal 8a to the source another mobile terminal 8b, a subscriber packet exchange apparatus 3a determines a link via which the data packet "1" should be sent out (1002). Because the subscriber packet exchange apparatus 3a is not sure whether the packet should be transferred to either a routing destination in which the destination mobile terminal is currently located or an external packet data network, after making only a number of copies of the first data packet "1" whose number is equal to a number of needed links (1003), as in the case of embodiment 1, and encapsulating the number of data packets "1" with a multicast address (1004), the subscriber packet exchange apparatus 3a transfers the number of data packets encapsulated to other subscriber packet exchange apparatuses other than subscriber packet exchange apparatus 3a itself (1005).

When receiving the data packet "1" encapsulated with the multicast address, the gateway and packet data exchange apparatus 1 decapsulates the received data packet "1" (1006) and determines the destination of the decapsulated data packet "1" (1007). As a result, when determining that the data packet is destined for a fixed terminal 10 connected with an external packet data network 9, the gateway and packet data exchange apparatus 1 transfers the data packet "1" to the external packet data network 9 (1008).

When transmission of a data packet "1a", from a fixed terminal 10 connected with an external packet data network 9 to the mobile terminal 8a is carried out immediately after the transfer of the data packet "1", the gateway and packet data exchange apparatus 1 carries out the transfer of this data packet "1a" without performing the sending back of a visitor response message to the subscriber packet exchange apparatus 3a, which is explained in Embodiments 7 and 9. During the transfer processing, the gateway and packet data exchange apparatus 1 acquires information on a routing area in which the mobile terminal 8a is currently located (1010, 1011) by sending and receiving a location information read request message and a location information read response message to and from a home location register 2. When receiving the data packet "1a", from the fixed terminal 10 connected with the external packet data network 9, the gateway and packet data exchange apparatus 1 encapsulates the data packet with a unicast address and in the form in which the visitor response message is provided in an option region as shown in FIG. 8, and transfers the encapsulated data packet to the subscriber packet exchange apparatus 3a (1012, 1013).

When receiving the data packet "1a" encapsulated with the unicast address, the subscriber packet exchange apparatus 3a decapsulates the data packet and also stores the visitor response as a link to the fixed terminal 10 connected with the external packet data network 9 because the visitor response is shown by the option region of the data packet (1014). The subscriber packet exchange apparatus 3a then transmits the decapsulated data packet "1a" to the mobile terminal 8a (1015).

In contrast, when determining that the data packet is destined for an internal mobile IP packet communication network after decapsulating the encapsulated data packet (1007), the gateway and packet data exchange apparatus 1 discards the data packet "1" (because the data packet "1" encapsulated with the multicast address has already been multicasted to the internal mobile IP packet communication network, the gateway and packet data exchange apparatus 1 discards the data packet).

After that, when receiving the next data packet "2" (1016) destined for the fixed terminal 10 connected with the external packet data network 9 from the source mobile terminal 8a, the subscriber packet exchange apparatus 3a determines a link via which the next data packet should be sent out (1017), as in the case of receiving the first data packet "1". In this case, because the subscriber packet exchange apparatus 3a has already determined the routing destination from the visitor response message, the subscriber packet exchange apparatus 3a encapsulates the datapacket "2" with a unicast address (1019) without making copies of the data packet "2" whose number is equal to a number of needed links (1018), and transfers the encapsulated data packet to only the gateway and packet data exchange apparatus 1 which is the routing destination (1020).

When receiving the data packet "2" encapsulated with the unicast address, the gateway and packet data exchange apparatus 1 determines the destination of the data packet (1022) after decapsulating the encapsulated data packet (1021). As a result, when determining that the data packet is destined for the fixed terminal 10 connected with the external packet data network 9, the gateway and packet data exchange apparatus 1 transfers the decapsulated data packet "2" to the external packet data network 9 (1023). In contrast, when determining that the data packet is destined for the internal mobile IP packet communication network, the gateway and packet data exchange apparatus 1 sets the destination address as a key and inquires of a home location register 2 about a routing area in which the destination mobile terminal is currently located (1024, 1025). The gateway and packet data exchange apparatus 1 then encapsulates the data packet "2" with a unicast address again according to a response to the inquiry from the home location register (1026), and transfers it to a predetermined subscriber packet exchange apparatus (1027).

As mentioned above, in accordance with this embodiment 10, in case where a fixed terminal that is a destination transmits a packet to a mobile terminal that is sending source when a gateway and packet exchange apparatus transmits a response message indicating that the fixed terminal that is a destination is connected with a network managed thereby to another subscriber packet exchange apparatus that is a sending source, the gateway and packet exchange apparatus transfers the packet from the destination fixed terminal to the source mobile terminal by superimposing the response message on the packet. Therefore, the subscriber packet exchange apparatus can carry out the transmission of data packets without having to inquire about whether each data packet is destined for a mobile terminal or a fixed terminal, thereby reducing the amount of signals being transmitted in the mobile IP packet communication system because of the disuse of a visitor response message. The mobile IP packet communication system can also carry out the transmission of packets between the source and destination mobile terminals with efficiency while reducing the transfer delay.

Embodiment 11

In a mobile IP packet communication system in accordance with this embodiment 11, either a subscriber packet exchange apparatus or a gateway and packet data exchange apparatus, which has received a packet encapsulated with a multicast address and destined for terminal equipment that is a destination, decapsulates the received packet and transfers the decapsulated packet to the destination terminal equipment, and transmits an RSVP reserve message defined by IETF RFC2205, as a visitor response message, to another subscriber packet exchange apparatus that is a sending source so as to reserve a band. Hereafter, the mobile IP packet communication system in accordance with this embodiment 11 will be explained with reference to drawings.

The mobile IP packet communication system in accordance with this embodiment 11 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 11 are as shown in FIG. 3.

Figure 15:
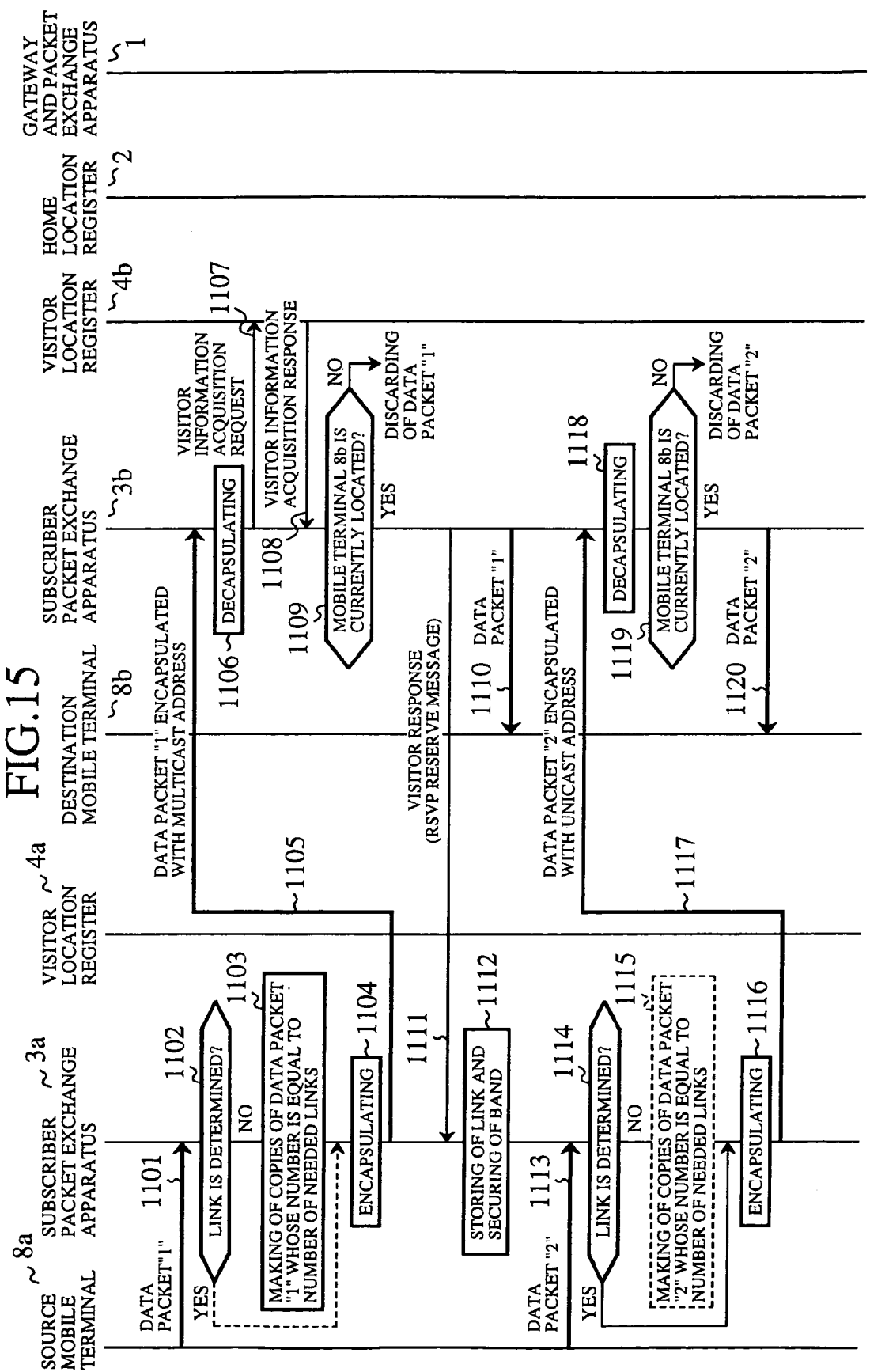
FIG. 15 is a sequence diagram for explaining an operation of a mobile IP packet communication system in accordance with embodiment 11 of the present invention.

FIG. 15 is a sequence diagram for explaining an operation of the mobile IP packet communication system in accordance with embodiment 11 of the present invention. The operation of the mobile IP packet communication system in accordance with this embodiment 11 will be explained hereafter with reference to the sequence diagram of FIG. 15.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (1001) that is sent from the source mobile terminal 8a to the destination mobile terminal 8b, a subscriber packet exchange apparatus 3a determines a link via which the data packet "1" should be sent out (1002). At this time, because the subscriber packet exchange apparatus 3a is not sure about the routing destination in which the destination mobile terminal 8b is currently located, after making only a number of copies of the first data packet "1" whose number is equal to the number of needed links (1103), as in the case of embodiment 2, and encapsulating the number of data packets "1" with a multicast address (1104), the subscriber packet exchange apparatus 3a transfers the number of data packets encapsulated to other subscriber packet exchange apparatuses other than the subscriber packet exchange apparatus 3a itself (1105).

When receiving the data packet "1" encapsulated with the multicast address, the subscriber packet exchange apparatus 3b retrieves the data packet "1" destined for the mobile terminal 8b by decapsulating the received data packet (1106), and acquires the visitor information on the mobile terminal 8b from a visitor location register 4b (1107, 1108) by inquiring of the visitor location register 4b about a routing area in which the destination mobile terminal 8b is currently located. The subscriber packet exchange apparatus 3b thus determines whether or not the mobile terminal 8b is currently located in a routing zone managed thereby (1109), and, when determining that the mobile terminal 8b is currently located in a routing zone managed thereby and identifying the routing zone, transfers the data packet "1" to the destination mobile terminal 8b by way of a radio base station and a base station control apparatus thereof (1110).

Then the subscriber packet exchange apparatus 3b transmits an RSVP reserve message, as a visitor response message, to the subscriber packet exchange apparatus 3a that has transmitted the data packet "1" encapsulated with the multicast address (1111). When receiving the RSVP reserve message, the subscriber packet exchange apparatus 3a stores it as a link to the mobile terminal 8b and secures a band according to this RSVP reserve message. The subscriber packet exchange apparatus 3a also secures a service quality for packet transmission between the subscriber packet exchange apparatus 3a that is the sending source and the subscriber packet exchange apparatus 3b that is the destination (1112).

When receiving the next data packet "2" (1113) that is sent from the source mobile terminal 8a to the mobile terminal 8b, the subscriber packet exchange apparatus 3a determines a link via which the next data packet should be sent out (1114), as in the case of receiving the first data packet "1". In this case, a because the subscriber packet exchange apparatus 3a has already determined the routing destination from the RSVP reserve message, the subscriber packet exchange apparatus 3a encapsulates the data packet "2" with a unicast address (1116) without making copies of the data packet "2" whose number is equal to the number of needed links (1115), and transfers the encapsulated data packet to only the subscriber packet exchange apparatus 3b which is the routing destination (1117).

When receiving the data packet "2" encapsulated with the unicast address, the subscriber packet exchange apparatus 3b performs the same processing on the received data packet "2" as that performed on the data packet "1" encapsulated with the multicast address. In other words, when receiving this encapsulated data packet "2", the subscriber packet exchange apparatus 3b decapsulates the encapsulated data packet (1118) and determines whether or not the mobile terminal 8b is currently located in a routing zone managed thereby (1119), and, when determining that the mobile terminal 8b is currently located in a routing zone managed thereby and identifying the routing zone, transfers the data packet "2", to the destination mobile terminal 8b (1120).

When transferring the data packet "2" to the destination mobile terminal 8b, the subscriber packet exchange apparatus 3b doesn't acquire the visitor information from the visitor location register 4b, as shown in FIG. 15. This is because the visitor information acquired when transferring the first data packet "1" has been cached. In contrast, when the visitor information has not been cached, the subscriber packet exchange apparatus 3b acquires the visitor information in the same manner that it does when transferring the data packet "1" (1107, 1108).

As mentioned above, in accordance with this embodiment 11, either a subscriber packet exchange apparatus or a gateway and packet data exchange apparatus, which has received a packet encapsulated with a multicast address and destined for a mobile terminal that is a destination, decapsulates the received packet and transfers the decapsulated packet to the destination mobile terminal, and transmits an RSVP reserve message, as a visitor response message, to another subscriber packet exchange apparatus that is the sending source of the packet so as to reserve a band. Therefore, the mobile IP packet communication system can route data packets directly to the subscriber packet exchange apparatus that manages a routing area in which the destination mobile terminal is currently located. Furthermore, when transferring the following data packets, the other subscriber packet exchange apparatus can encapsulate each of the packets with a unicast address in response to the visitor response message transmitted from the subscriber packet exchange apparatus that is the destination. Furthermore, the mobile IP packet communication system can ensure a given service quality by using the RSV reserve message as the visitor response message, and can also carry out the transmission of packets between the source and destination mobile terminals with efficiency while reducing the transfer delay.

Embodiment 12

In a mobile IP packet communication system in accordance with this embodiment 12, either a subscriber packet exchange apparatus or a gateway and packet data exchange apparatus, which has received a packet encapsulated with a multicast address and destined for a mobile terminal that is a destination, decapsulates the received packet and transfers the decapsulated packet to the destination mobile terminal, and transmits an MPLS LDP message that complies with Internet Draft provided by IETF, as a visitor response message, to another subscriber packet exchange apparatus that is the sending source of the packet so as to set a virtual communication path. Hereafter, the mobile IP packet communication system in accordance with this embodiment 12 will be explained with reference to drawings.

The mobile IP packet communication system in accordance with this embodiment 12 has the same structure as that of embodiment 1 as shown in FIG. 1. The format of user packets transferred between a gateway and packet data exchange apparatus and subscriber packet exchange apparatuses and between the subscriber packet exchange apparatuses in the mobile IP packet communication system of embodiment 12 are as shown in FIG. 3.

Figure 16:
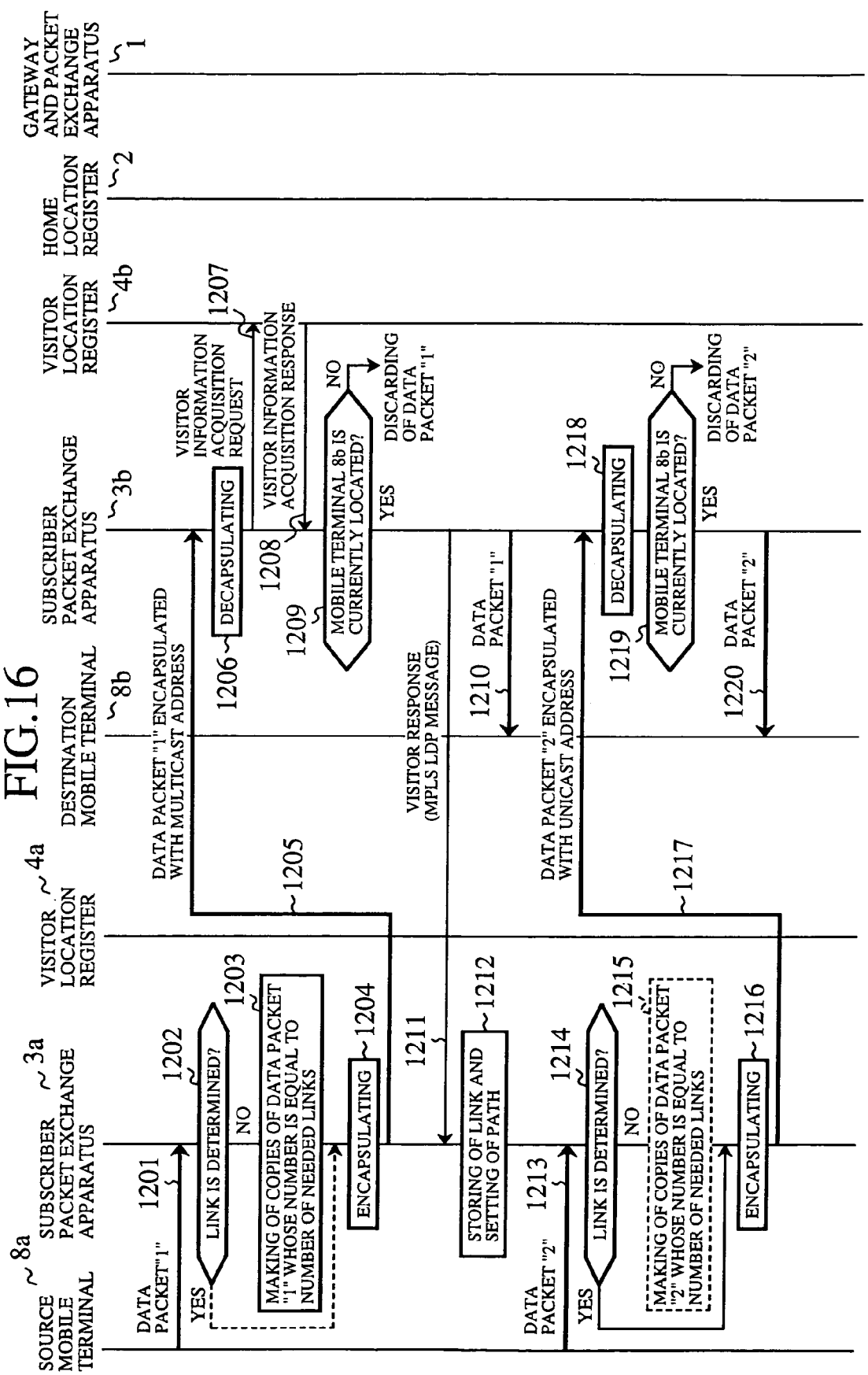
FIG. 16 is a sequence diagram for explaining an operation of a mobile IP packet communication system in accordance with embodiment 12 of the present invention.
Figure 17:
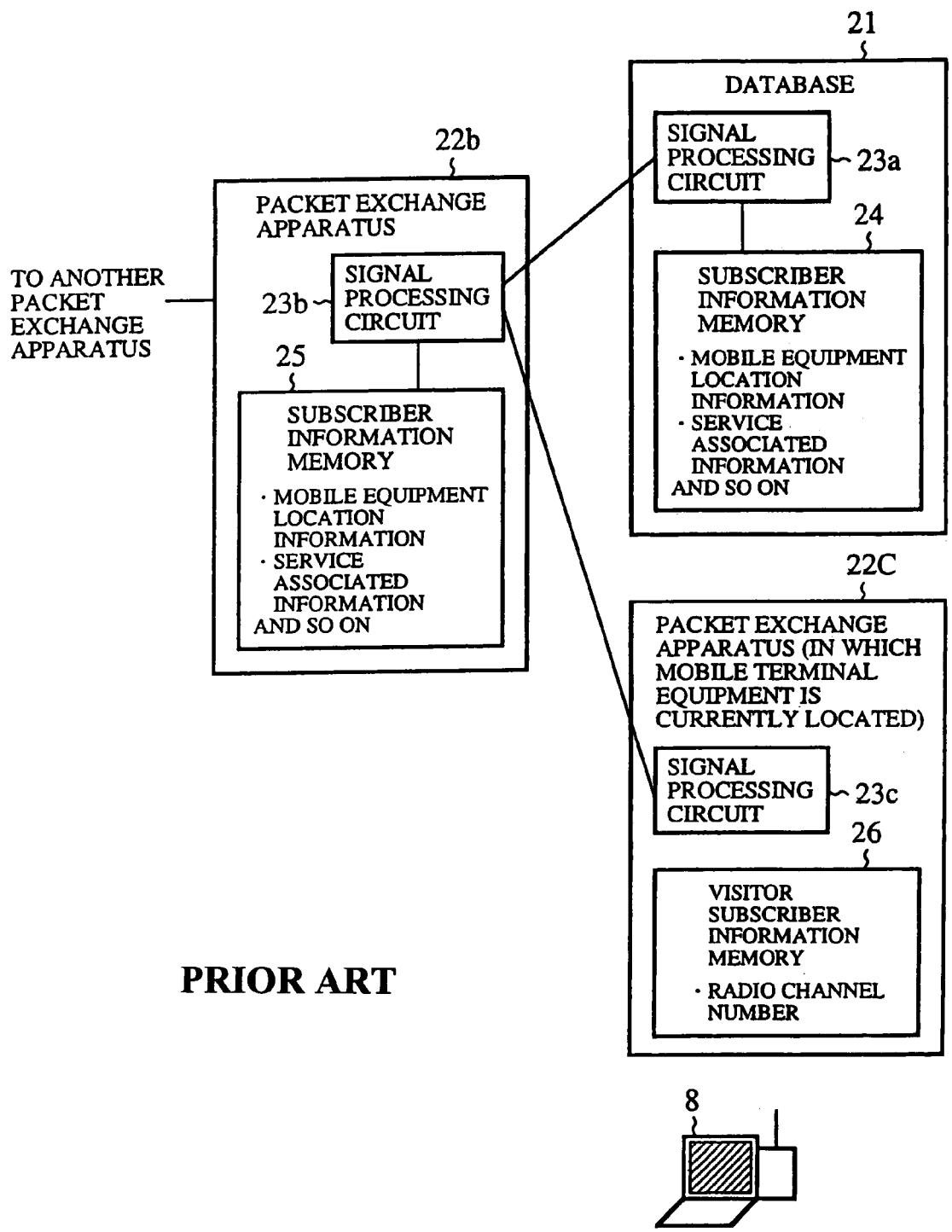
FIG. 17 is a block diagram showing the structure of a prior art mobile IP packet communication system.
Figure 18:
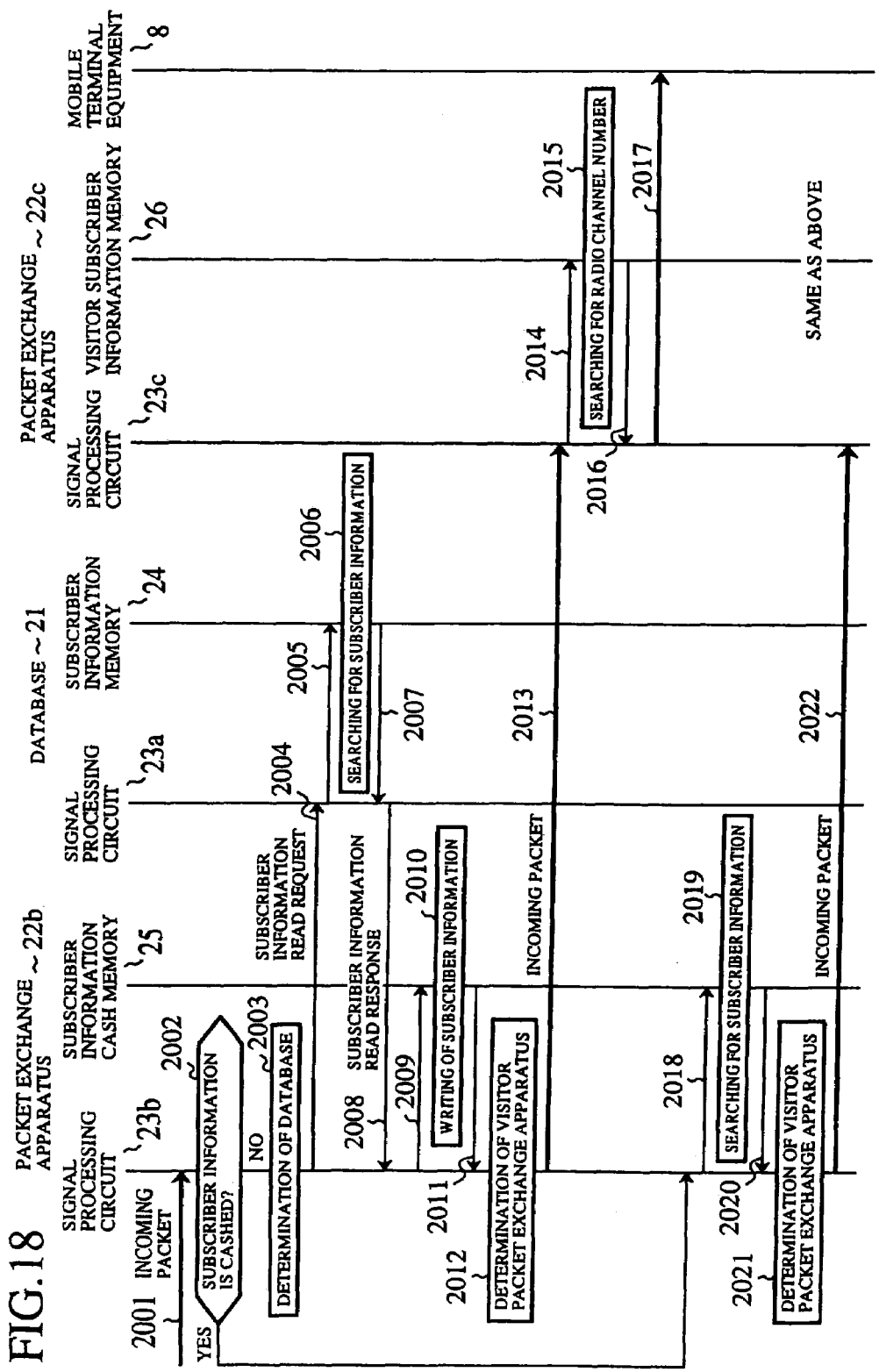
FIG. 18 is a sequence diagram for explaining control of the prior art mobile IP packet communication system as shown in FIG. 17.
Figure 19:
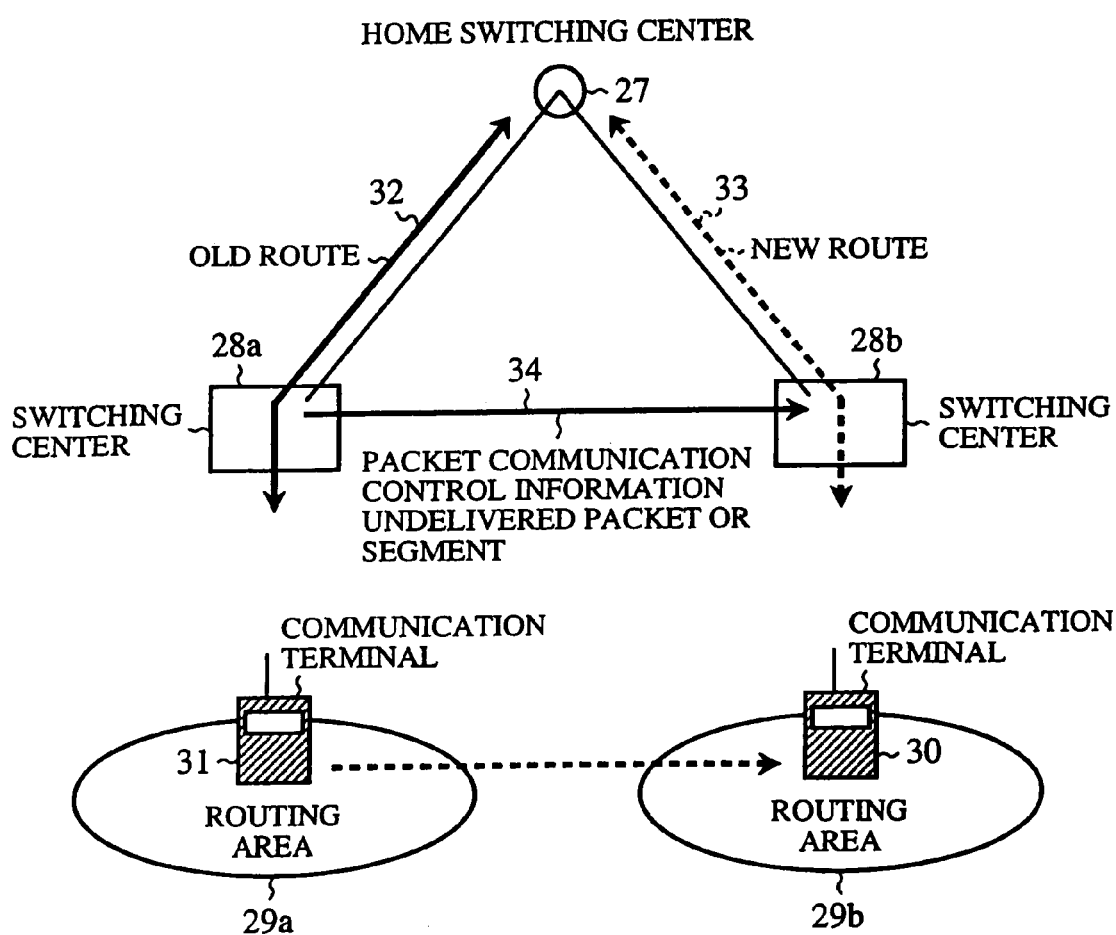
FIG. 19 is a block diagram showing the structure of another prior art mobile IP packet communication system.

FIG. 16 is a sequence diagram for explaining an operation of the mobile IP packet communication system in accordance with embodiment 12 of the present invention. The operation of the mobile IP packet communication system in accordance with this embodiment 12 will be explained hereafter with reference to the sequence diagram of FIG. 16.

A procedure for registering the locations of a mobile terminal 8a that is a sending source and another mobile terminal 8b that is a destination is carried out in the same manner as explained in Embodiment 1 (101 to 108), and therefore the explanation of the procedure will be omitted hereafter.

When receiving the first data packet "1" (1201) that is sent from the source mobile terminal 8a to the destination mobile terminal 8b, a subscriber packet exchange apparatus 3a determines a link via which the data packet "1" should be sent out (1202). At this time, because the subscriber packet exchange apparatus 3a is not sure about the routing destination in which the destination mobile terminal 8b is currently located, after making only a number of copies of the first data packet "1" whose number is equal to the number of needed links (1203), as in the case of embodiment 2, and encapsulating the number of data packets "1" with a multicast address (1204), the subscriber packet exchange apparatus 3a transfers the number of data packets encapsulated to other subscriber packet exchange apparatuses other than the subscriber packet exchange apparatus 3a itself (1205).

When receiving the data packet "1" encapsulated with the multicast address, the subscriber packet exchange apparatus 3b retrieves the data packet "1" destined for the mobile terminal 8b after decapsulating the received data packet (1206), and acquires the visitor information on the mobile terminal 8b from a visitor location register 4b (1207, 1208) by inquiring of the visitor location register 4b about a routing area in which the mobile terminal 8b is currently located. The subscriber packet exchange apparatus 3b thus determines whether or not the mobile terminal 8b is currently located in a routing zone managed thereby (1209), and, when determining that the mobile terminal 8b is currently located in a routing zone managed thereby and identifying the routing zone, transfers the data packet "1" to the destination mobile terminal 8b by way of a radio base station and a base station control apparatus thereof (1210).

Then the subscriber packet exchange apparatus 3b transmits an MPLS LDP message, as a visitor response message, to the subscriber packet exchange apparatus 3a that has transmitted the data packet "1" encapsulated with the multicast address thereto (1211). When receiving the MPLS LDP message, the subscriber packet exchange apparatus 3a stores the MPLS LDP message as a link to the mobile terminal 8b and sets a virtual communication path according to this MPLS LDP message (1212). The subscriber packet exchange apparatus 3a also secures a service quality for packet transmission between the subscriber packet exchange apparatus 3a that is the sending source and the subscriber packet exchange apparatus 3b that is the destination.

When receiving the next data packet "2" (1213) transmitted from the source mobile terminal 8a to the mobile terminal 8b, the subscriber packet exchange apparatus 3a determines a link via which the next data packet should be sent out (1214), as in the case of receiving the first data packet "1". In this case, because the subscriber packet exchange apparatus 3a has already determined the routing destination from the MPLS LDP message, the subscriber packet exchange apparatus 3a encapsulates the data packet "2" with a unicast address (1216) without making copies of the data packet "2" whose number is equal to the number of needed links (1215), and transfers the encapsulated data packet to only the subscriber packet exchange apparatus 3b which is the routing destination (1217).

When receiving the data packet "2" encapsulated with the unicast address, the subscriber packet exchange apparatus 3b performs the same processing on the received data packet "2" as that performed on the data packet "1" encapsulated with the multicast address. In other words, when receiving the encapsulated data packet "2", the subscriber packet exchange apparatus 3b decapsulates the encapsulated data packet (1218) and determines whether or not the mobile terminal 8b is currently located in a routing zone managed thereby (1219), and, when determining that the mobile terminal 8b is currently located in a routing zone managed thereby and identifying the routing zone, transfers the data packet "2" to the destination mobile terminal 8b (1220).

When transferring the data packet "2" to the destination mobile terminal 8b, the subscriber packet exchange apparatus 3b doesn't acquire the visitor information from the visitor location register 4b, as shown in FIG. 16. This is because the visitor information acquired when transferring the first data packet "1" has been cached. In contrast, when the visitor information has not been cached, the subscriber packet exchange apparatus 3b acquires the visitor information in the same manner that it does when transferring the data packet "1" (1207, 1208).

As mentioned above, in accordance with this embodiment 12, either a subscriber packet exchange apparatus or a gateway and packet data exchange apparatus, which has received a packet encapsulated with a multicast address and destined for a mobile terminal that is a destination, decapsulates the received packet and transfers the decapsulated packet to the destination mobile terminal, and transmits an MPLS LDP message, as a visitor response message, to another subscriber packet exchange apparatus that is the sending source of the packet so as to set a virtual communication path. Therefore, the mobile IP packet communication system can route data packets directly to the subscriber packet exchange apparatus that manages a routing area in which the destination mobile terminal is currently located. Furthermore, when transferring the following data packets, the other subscriber packet exchange apparatus can encapsulate each of the packets with a unicast address in response to the visitor response message transmitted from the subscriber packet exchange apparatus that is the destination. Furthermore, the mobile IP packet communication system can ensure a given service quality by using the MPLS LDP message as the visitor response message, and can also carry out the transmission of packets between the source and destination mobile terminals with efficiency while reducing the transfer delay.

INDUSTRIAL APPLICABILITY

As mentioned above, a moving object IP packet communication system in accordance with the present invention can effectively serve as a mobile communication system in which a subscriber packet exchange apparatus that is a sending station encapsulates a packet to be transferred to either a mobile terminal or a fixed terminal with a multicast address and transfers the packet without acquiring the location information on the location of the mobile terminal that is a destination from a home location register or a visitor location register. Furthermore, a moving object IP packet communication system in accordance with the present invention can effectively serve as a mobile communication system in which a subscriber packet exchange apparatus that is a destination transmits a visitor response message to another subscriber packet exchange apparatus that is a sending source, thereby reducing the amount of signals in the network. In addition, a moving object IP packet communication system in accordance with the present invention can effectively serve as a mobile communication system in which response information is superimposed on a data packet to be transferred, thereby eliminating the transmission of the visitor response message. Particularly, a moving object IP packet communication system in accordance with the present invention is suitable for transmitting an RSVP reserve message or an MPSL LDP message as the visitor response message.

The invention claimed is:

1. A mobile IP packet communication system comprising:
a plurality of mobile terminals;
a plurality of radio base stations each configured to communicate with said mobile terminals;
a plurality of base station control apparatuses each configured to manage the plurality of said radio base stations and to control radio channels;
a plurality of subscriber packet exchange apparatuses each configured to manage a routing area including a plurality of said radio base stations and a single base station control apparatus and to control a transfer of packets to one of said plurality of mobile terminals;
a gateway and packet data exchange apparatus connected to each of said plurality of subscriber packet exchange apparatuses and a data packet network disposed outside said mobile IP packet communication system and configured to serve as a gateway between each of said plurality of subscriber packet exchange apparatuses and said data packet network disposed outside said mobile IP packet communication system;
a home location register configured to manage information regarding routing areas in which said plurality of mobile terminals are currently located, respectively; and
a plurality of visitor location registers each configured to manage information regarding zones within a corresponding routing area in which said plurality of mobile terminals may be currently located,
wherein when transferring a data packet destined for a first one of said plurality of subscriber packet exchange apparatuses that manages the routing area in which one of said plurality of mobile terminals, that is the destination, is currently located, said mobile IP packet communication system is configured to transmit the data packet between a second one of said plurality of subscriber packet exchange apparatuses that manages a routing area in which one of said plurality of mobile terminals, that is a sending source, is currently located and said gateway and packet data exchange apparatus, between said second one of said plurality of subscriber packet exchange apparatuses and each of said plurality of subscriber packet exchange apparatuses after copying the data packet a number of times, equal to the number of subscriber packet exchange apparatuses linked to said second subscriber packet exchange apparatus and encapsulating said copied data packets with a multicast address, without acquiring location information on a location of said destination one of said plurality of mobile terminals, and between said second one of said plurality of subscriber packet exchange apparatuses and said first one of said plurality of subscriber packet exchange apparatuses after encapsulating the data packet by adding unicast address information corresponding to said first one of said plurality of subscriber packet exchange apparatuses that is the destination of the data packet when said first one of said plurality of subscriber packet exchange apparatuses confirms that said one of said plurality of mobile terminals, that is the destination, is currently located therein.

2. The mobile IP packet communication system according to claim 1, wherein when receiving the packet encapsulated with the multicast address and destined for said destination one of said plurality of mobile terminals, said first one of said plurality of subscriber packet exchange apparatuses to which said destination one of said plurality of mobile terminals belongs decapsulates the received packet and transfers the decapsulated packet to said destination one of said plurality of mobile terminals and transmits a response message indicating that said destination one of said plurality of mobile terminals is currently located in the routing area managed thereby to said second one of said plurality of subscriber packet exchange apparatuses that is the sending source.

3. The mobile IP packet communication system according to claim 2, wherein said first one of said plurality of subscriber packet exchange apparatuses which has received the packet that is encapsulated with the multicast address to which said destination one of said plurality of mobile terminals belongs decapsulates the received packet and transfers the decapsulated packet to said destination one of said plurality of mobile terminals, and starts a timer when transmitting the response message and repeatedly transmits the response message to said second one of said plurality of subscriber packet exchange apparatuses that is the sending source until said timer expires.

4. The mobile IP packet communication system according to claim 2, wherein after encapsulating the packet that said second one of said plurality of subscriber packet exchange apparatuses has received from said source one of said plurality of mobile terminals and transferring the packet to said first one of said plurality of subscriber packet exchange apparatuses to which said destination one of said plurality of mobile terminals belongs, said second one of said plurality of subscriber packet exchange apparatuses provides a status notification region for notification of communication status in a header region of each following packet to be transmitted in advance, and when receiving the response message from said first one of said plurality of subscriber packet exchange apparatuses to which said destination one of said plurality of mobile terminals belongs, said first one of said plurality of subscriber packet exchange apparatuses that is the destination is notified that said second one of said plurality of subscriber packet exchange apparatuses has already received the response message by using the status notification region of each following packet to be transmitted.

5. The mobile IP packet communication system according to claim 1, wherein when said destination one of said plurality of mobile terminals transmits a packet to said source one of said plurality of mobile terminals and when said first one of said plurality of subscriber packet exchange apparatuses that is a destination transmits a response message indicating that said destination one of said plurality of mobile terminals is currently located in the routing area managed thereby to said second one of said plurality of subscriber packet exchange apparatuses that is a sending source, said first one of said plurality of subscriber packet exchange apparatuses transfers the packet from said destination one of said plurality of mobile terminals to said source one of said plurality of mobile terminals by superimposing information corresponding to the response message on the packet.

6. The mobile IP packet communication system according to claim 1, wherein when transferring the packet received from said source one of said plurality of mobile terminals to either said first one of said plurality of subscriber packet exchange apparatuses to which said destination one of said plurality of mobile terminals belongs or an external packet data network to which a fixed terminal that is a destination belongs, said second one of said plurality of subscriber packet exchange apparatuses determines whether the packet is destined for either said destination one of said plurality of mobile terminals or said fixed terminal, encapsulates the packet with the multicast address when the packet is destined for said destination one of said plurality of mobile terminals, and transfers the packet to said first one of said plurality of subscriber packet exchange apparatuses to which said destination one of said plurality of mobile terminals belongs.

7. The mobile IP packet communication system according to claim 1, wherein when transferring the packet received from said source one of said plurality of mobile terminals to either said first one of said plurality of subscriber packet exchange apparatuses to which said destination one of said plurality of mobile terminals belongs or an external packet data network to which a fixed terminal that is a destination belongs, said second one of said plurality of subscriber packet exchange apparatuses encapsulates the packet with the multicast address without determining whether the packet is destined for either said destination one of said plurality of mobile terminals or said fixed terminal, and, when receiving the packet encapsulated with the multicast address and destined for said fixed terminal that is a destination, said gateway and packet exchange apparatus transfers the received packet to said fixed terminal that is a destination after decapsulating the packet and transmits a response message indicating that said fixed terminal is connected with a network managed thereby to said second one of said plurality of subscriber packet exchange apparatuses that is a sending source.

8. The mobile IP packet communication system according to claim 1, wherein when transferring the packet received from said source one of said plurality of mobile terminals to either said first one of said plurality of subscriber packet exchange apparatuses to which said destination one of said plurality of mobile terminals belongs or an external packet data network to which a fixed terminal that is a destination belongs, said second one of said plurality of subscriber packet exchange apparatuses determines whether the packet is destined for either said destination one of said plurality of mobile terminals or said fixed terminal, and encapsulates the packet with the multicast address and transfers the packet without acquiring the location information on the location of said destination one of said plurality of mobile terminals from either said home location register or said corresponding visitor location register when determining that the packet is destined for said destination one of said plurality of mobile terminals and that the packet is to be transmitted through real-time packet communications.

9. The mobile IP packet communication system according to claim 7, wherein when receiving the packet encapsulated with the multicast address and destined for said fixed terminal that is a destination, said gateway and packet exchange apparatus decapsulates the received packet and transfers the decapsulated packet to said fixed terminal, and starts a timer when transmitting the response message and repeatedly transmits the response message to said second one of said plurality of subscriber packet exchange apparatuses that is a sending source until said timer expires, or repeatedly transmits the response message to said second one of said plurality of subscriber packet exchange apparatuses that is a sending source until being notified that said second one of said plurality of subscriber packet exchange apparatuses has already received the response message through a status notification region located in a header region of each following packet transmitted thereto.

10. The mobile IP packet communication system according to claim 1, wherein when a fixed terminal that is a destination transmits a packet to said source one of said plurality of mobile terminals when said gateway and packet exchange apparatus transmits a response message indicating that said fixed terminal is connected with a network managed thereby to said second one of said plurality of subscriber packet exchange apparatuses that is a sending source, said gateway and packet exchange apparatus transfers the packet from said destination fixed terminal to said source one of said plurality of mobile terminals by superimposing the response message on the packet.

11. The mobile IP packet communication system according to claim 2, wherein either said first one of said plurality of subscriber packet exchange apparatuses or said gateway and packet exchange apparatus, which has received the packet encapsulated with the multicast address and destined for destination terminal equipment, decapsulates the received packet and transfers the decapsulated packet to said destination terminal equipment, and transmits an RSVP reserve message, as the response message, to said second one of said plurality of subscriber packet exchange apparatuses that is a sending source so as to reserve a band.

12. The mobile IP packet communication system according to claim 2, wherein either said first one of said plurality of subscriber packet exchange apparatuses or said gateway and packet exchange apparatus, which has received the packet encapsulated with the multicast address and destined for destination terminal equipment, decapsulates the received packet and transfers the decapsulated packet to said destination terminal equipment, and transmits an MPLS LDP message, as the response message, to said second one of said plurality of subscriber packet exchange apparatuses that is a sending source so as to set a virtual path.

* * * * *